(12) United States Patent
de Castro Alves

(10) Patent No.: US 10,956,422 B2
(45) Date of Patent: Mar. 23, 2021

(54) INTEGRATING EVENT PROCESSING WITH MAP-REDUCE

(71) Applicant: Oracle International Corporation, Redwood Shores, CA (US)

(72) Inventor: Alexandre de Castro Alves, Doral, FL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/079,538

(22) Filed: Nov. 13, 2013

(65) Prior Publication Data

US 2014/0156683 A1    Jun. 5, 2014

Related U.S. Application Data

(60) Provisional application No. 61/733,844, filed on Dec. 5, 2012, provisional application No. 61/806,744, filed on Mar. 29, 2013.

(51) Int. Cl.
*G06F 16/2455* (2019.01)
(52) U.S. Cl.
CPC .............................. *G06F 16/24568* (2019.01)
(58) Field of Classification Search
CPC ................................................. G06F 16/24568
See application file for complete search history.

(56) References Cited

U.S. PATENT DOCUMENTS

| 4,996,687 A | 2/1991 | Hess et al. |
| 5,051,947 A | 9/1991 | Messenger et al. |
| 5,339,392 A | 8/1994 | Risberg et al. |

(Continued)

FOREIGN PATENT DOCUMENTS

| CN | 1689298 | 10/2005 |
| CN | 101957832 | 1/2011 |

(Continued)

OTHER PUBLICATIONS

Wikipedia contributors. "MapReduce." Wikipedia, The Free Encyclopedia. Wikipedia, The Free Encyclopedia, Apr. 16, 2016. Web. May 6, 2016.*

(Continued)

*Primary Examiner* — James Trujillo
*Assistant Examiner* — Kurt A Mueller
(74) *Attorney, Agent, or Firm* — Kilpatrick Townsend & Stockton LLP

(57) ABSTRACT

Large quantities of data can be processed and/or queried relatively quickly using a combination of continuous event processing and a Map-Reduce algorithmic tool. The continuous event processor can continuously produce real-time results by merging (a) CQL query results from events received since a currently executing Map-Reduce job was started with (b) a most recent query result produced by a most recently completed Map-Reduce job. When the currently executing Map-Reduce job completes, its query result can be stored and made accessible to the continuous event processor, and a new Map-Reduce job can be started relative to event data that has grown in size since the execution of the last Map-Reduce job. The Map-Reduce algorithmic tool provides a convenient mechanism for analyzing and processing large quantities of data.

19 Claims, 6 Drawing Sheets

(56) References Cited

U.S. PATENT DOCUMENTS

| | | | |
|---|---|---|---|
| 5,495,600 A | 2/1996 | Terry et al. |
| 5,691,917 A | 11/1997 | Harrison |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | Demichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray et al. |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,501,852 B1 | 12/2002 | Clark et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,633,867 B1 * | 10/2003 | Kraft ............. G06F 17/30867 705/26.1 |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,904,019 B2 | 6/2005 | Heinen et al. |
| 6,954,791 B2 | 10/2005 | Darby |
| 6,985,904 B1 | 1/2006 | Kaluskar et al. |
| 6,986,019 B1 | 1/2006 | Bagashev et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,139,977 B1 | 11/2006 | Russell |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,263,464 B1 | 8/2007 | Dugger |
| 7,284,041 B2 | 10/2007 | Nakatani et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,440,461 B2 | 10/2008 | Sahita et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,526,804 B2 | 4/2009 | Shelest et al. |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,984,043 B1 | 7/2011 | Waas |
| 7,987,204 B2 | 7/2011 | Stokes |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,099,400 B2 | 1/2012 | Haub et al. |
| 8,112,378 B2 | 2/2012 | Kudo et al. |
| 8,122,006 B2 | 2/2012 | De Castro Alves et al. |
| 8,134,184 B2 | 3/2012 | Becker et al. |
| 8,145,686 B2 | 3/2012 | Raman et al. |
| 8,145,859 B2 | 3/2012 | Park et al. |
| 8,155,880 B2 | 4/2012 | Patel et al. |
| 8,190,738 B2 | 5/2012 | Ruehle |
| 8,195,648 B2 | 6/2012 | Zabback et al. |
| 8,204,873 B2 | 6/2012 | Chavan |
| 8,260,803 B2 | 9/2012 | Hsu et al. |

(56) References Cited

U.S. PATENT DOCUMENTS

| | | |
|---|---|---|
| 8,290,776 B2 | 10/2012 | Moriwaki et al. |
| 8,296,316 B2 | 10/2012 | Jain et al. |
| 8,307,197 B2 | 11/2012 | Koch, III |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,332,502 B1 | 12/2012 | Neuhaus et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,744 B2 | 5/2013 | Alves et al. |
| 8,458,175 B2 | 6/2013 | Stokes |
| 8,498,956 B2 | 7/2013 | Srinivasan et al. |
| 8,527,458 B2 | 9/2013 | Park et al. |
| 8,572,589 B2 | 10/2013 | Cataldo et al. |
| 8,589,436 B2 | 11/2013 | Srinivasan et al. |
| 8,595,840 B1 | 11/2013 | Malibiran et al. |
| 8,676,841 B2 | 3/2014 | Srinivasan et al. |
| 8,713,038 B2 | 4/2014 | Cohen et al. |
| 8,713,049 B2 | 4/2014 | Jain et al. |
| 8,719,207 B2 | 5/2014 | Ratnam et al. |
| 8,738,572 B2 | 5/2014 | Bird et al. |
| 8,745,070 B2 | 6/2014 | Krisnamurthy |
| 8,762,369 B2 | 6/2014 | Macho et al. |
| 8,880,493 B2 | 11/2014 | Chen et al. |
| 9,015,102 B2 | 4/2015 | van Lunteren |
| 9,047,249 B2 | 6/2015 | de Castro Alves et al. |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 9,286,352 B2 | 3/2016 | Park et al. |
| 9,292,574 B2 | 3/2016 | Hsiao et al. |
| 9,298,788 B1 | 3/2016 | Kekre et al. |
| 9,298,854 B2 | 3/2016 | Ikawa et al. |
| 9,305,057 B2 | 4/2016 | De Castro Alves et al. |
| 9,305,238 B2 | 4/2016 | Srinivasan et al. |
| 9,329,975 B2 | 5/2016 | Park et al. |
| 9,361,308 B2 | 6/2016 | Deshmukh et al. |
| 9,390,135 B2 | 7/2016 | Alves et al. |
| 9,405,854 B2 | 8/2016 | Jerzak et al. |
| 9,418,113 B2 | 8/2016 | Bishnoi et al. |
| 9,424,150 B2 | 8/2016 | Jerzak et al. |
| 9,430,494 B2 | 8/2016 | Park et al. |
| 9,535,761 B2 | 1/2017 | Park et al. |
| 9,563,663 B2 | 2/2017 | Shukla et al. |
| 9,703,836 B2 | 7/2017 | Hsiao et al. |
| 9,712,645 B2 | 7/2017 | de Castro Alves et al. |
| 9,715,529 B2 | 7/2017 | Park et al. |
| 9,756,104 B2 | 9/2017 | Shukla et al. |
| 9,804,892 B2 | 10/2017 | Park et al. |
| 9,805,095 B2 | 10/2017 | Deshmukh et al. |
| 9,852,186 B2 | 12/2017 | Herwadkar et al. |
| 9,886,486 B2 | 2/2018 | De Castro Alves et al. |
| 9,894,147 B1 | 2/2018 | Zalpuri et al. |
| 9,934,263 B1 | 4/2018 | Black et al. |
| 9,934,279 B2 | 4/2018 | Kali et al. |
| 9,946,756 B2 | 4/2018 | Hsiao et al. |
| 9,953,059 B2 | 4/2018 | Deshmukh et al. |
| 9,972,103 B2 | 5/2018 | De Castro Alves et al. |
| 9,990,401 B2 | 6/2018 | Toillion et al. |
| 9,990,402 B2 | 6/2018 | Srinivasan et al. |
| 10,025,825 B2 | 7/2018 | Deshmukh et al. |
| 10,042,890 B2 | 8/2018 | Hsiao et al. |
| 10,083,210 B2 | 9/2018 | De Castro Alves et al. |
| 10,095,547 B1 | 10/2018 | Kulkarni et al. |
| 10,102,250 B2 | 10/2018 | Deshmukh et al. |
| 10,120,907 B2 | 11/2018 | De Castro Alves et al. |
| 2002/0023211 A1 | 2/2002 | Roth et al. |
| 2002/0032804 A1 | 3/2002 | Hunt |
| 2002/0038217 A1 | 3/2002 | Young |
| 2002/0038306 A1 | 3/2002 | Griffin et al. |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0030421 A1 | 2/2004 | Haley |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0027698 A1 | 2/2005 | Collet et al. |
| 2005/0055338 A1 | 3/2005 | Warner et al. |
| 2005/0065949 A1 | 3/2005 | Warner et al. |
| 2005/0071217 A1 | 3/2005 | Hoogs et al. |
| 2005/0096124 A1 | 5/2005 | Stronach |
| 2005/0097128 A1 | 5/2005 | Ryan et al. |
| 2005/0108368 A1 | 5/2005 | Mohan |
| 2005/0119988 A1 | 6/2005 | Buch et al. |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |

(56) References Cited

U.S. PATENT DOCUMENTS

| | | |
|---|---|---|
| 2006/0155719 A1 | 7/2006 | Mihaeli et al. |
| 2006/0166704 A1 | 7/2006 | Benco et al. |
| 2006/0167704 A1 | 7/2006 | Nicholls et al. |
| 2006/0167856 A1 | 7/2006 | Angele et al. |
| 2006/0167869 A1 | 7/2006 | Jones |
| 2006/0212441 A1 | 9/2006 | Tang et al. |
| 2006/0218123 A1 | 9/2006 | Chowdhuri et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0168154 A1 | 7/2007 | Ericson |
| 2007/0192301 A1 | 8/2007 | Posner |
| 2007/0198479 A1 | 8/2007 | Cai et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0250487 A1* | 10/2007 | Reuther ............ G06F 17/30705 |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0021914 A1 | 1/2008 | Davies |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0072221 A1 | 3/2008 | Chkodrov et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0098370 A1* | 4/2008 | Fontoura ............ G06F 17/3041 717/139 |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0133594 A1 | 6/2008 | Fotinatos et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0275891 A1 | 11/2008 | Park et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | Kanthi et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0089078 A1 | 4/2009 | Bursey |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112779 A1 | 4/2009 | Wolf et al. |
| 2009/0112802 A1 | 4/2009 | Srinivasan et al. |
| 2009/0112803 A1 | 4/2009 | Srinivasan et al. |
| 2009/0112809 A1 | 4/2009 | Wolff et al. |
| 2009/0112853 A1 | 4/2009 | Nishizawa et al. |
| 2009/0125536 A1 | 5/2009 | Lu et al. |
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216728 A1 | 8/2009 | Brainerd et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0228465 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0292759 A1 | 11/2009 | Piper et al. |
| 2009/0292979 A1 | 11/2009 | Aggarwal |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0022627 A1 | 1/2010 | Scherer et al. |
| 2010/0023498 A1 | 1/2010 | Dettinger et al. |
| 2010/0030896 A1 | 2/2010 | Chandramouli et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishikawa |
| 2010/0106946 A1 | 4/2010 | Imaki et al. |
| 2010/0125572 A1* | 5/2010 | Poblete ............ G06F 17/30867 707/722 |
| 2010/0125574 A1 | 5/2010 | Navas |
| 2010/0125584 A1 | 5/2010 | Navas |

(56) References Cited

U.S. PATENT DOCUMENTS

| | | |
|---|---|---|
| 2010/0138405 A1 | 6/2010 | Mihaila |
| 2010/0161589 A1 | 6/2010 | Nica et al. |
| 2010/0223283 A1 | 9/2010 | Lee et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016123 A1 | 1/2011 | Pandey et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0035253 A1 | 2/2011 | Mason et al. |
| 2011/0040746 A1 | 2/2011 | Handa et al. |
| 2011/0040827 A1 | 2/2011 | Katsunuma et al. |
| 2011/0055192 A1 | 3/2011 | Tang et al. |
| 2011/0084967 A1 | 4/2011 | De Pauw et al. |
| 2011/0093162 A1 | 4/2011 | Nielsen et al. |
| 2011/0105857 A1 | 5/2011 | Zhang et al. |
| 2011/0126201 A1 | 5/2011 | Iyer et al. |
| 2011/0131588 A1 | 6/2011 | Allam et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | De Castro et al. |
| 2011/0213802 A1 | 9/2011 | Singh et al. |
| 2011/0246445 A1 | 10/2011 | Mishra et al. |
| 2011/0270879 A1 | 11/2011 | Srinivasan et al. |
| 2011/0282812 A1 | 11/2011 | Chandramouli et al. |
| 2011/0295841 A1 | 12/2011 | Sityon et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0054173 A1 | 3/2012 | Andrade et al. |
| 2012/0072455 A1 | 3/2012 | Jain et al. |
| 2012/0078951 A1 | 3/2012 | Hsu et al. |
| 2012/0116982 A1 | 5/2012 | Yoshida et al. |
| 2012/0130963 A1 | 5/2012 | Luo et al. |
| 2012/0131139 A1 | 5/2012 | Siripurapu et al. |
| 2012/0158783 A1 | 6/2012 | Nice et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0185584 A1 | 7/2012 | Pandit |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0323941 A1 | 12/2012 | Chkodrov et al. |
| 2012/0324453 A1 | 12/2012 | Chandramouli et al. |
| 2012/0331333 A1 | 12/2012 | Imaki |
| 2013/0007539 A1 | 1/2013 | Ananthapadmanabh et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0066855 A1 | 3/2013 | Gupta et al. |
| 2013/0080413 A1 | 3/2013 | Chen et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0275452 A1 | 10/2013 | Krishnamurthy et al. |
| 2013/0332240 A1 | 12/2013 | Patri et al. |
| 2014/0006474 A1 | 1/2014 | White et al. |
| 2014/0019194 A1 | 1/2014 | Anne et al. |
| 2014/0059109 A1 | 2/2014 | Jugel et al. |
| 2014/0082013 A1 | 3/2014 | Wolf et al. |
| 2014/0095425 A1 | 4/2014 | Sipple et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0195559 A1 | 7/2014 | Ko et al. |
| 2014/0201225 A1 | 7/2014 | Bishnoi et al. |
| 2014/0201355 A1 | 7/2014 | Bishnoi et al. |
| 2014/0237487 A1 | 8/2014 | Prasanna et al. |
| 2014/0324530 A1 | 10/2014 | Thompson et al. |
| 2014/0358959 A1 | 12/2014 | Bishnoi et al. |
| 2014/0372550 A1 | 12/2014 | Said et al. |
| 2014/0379712 A1 | 12/2014 | Lafuente Alvarez |
| 2015/0007320 A1 | 1/2015 | Liu et al. |
| 2015/0103837 A1 | 4/2015 | Dutta |
| 2015/0156241 A1 | 6/2015 | Shukla et al. |
| 2015/0161214 A1 | 6/2015 | Kali et al. |
| 2015/0169786 A1 | 6/2015 | Jerzak et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0004751 A1 | 1/2016 | Lafuente Alvarez et al. |
| 2016/0034311 A1 | 2/2016 | Park et al. |
| 2016/0063080 A1 | 3/2016 | Nano et al. |
| 2016/0085772 A1 | 3/2016 | Vermeulen et al. |
| 2016/0085809 A1 | 3/2016 | De Castro et al. |
| 2016/0085810 A1 | 3/2016 | De Castro et al. |
| 2016/0103882 A1 | 4/2016 | Deshmukh et al. |
| 2016/0127517 A1 | 5/2016 | Shcherbakov et al. |
| 2016/0140180 A1 | 5/2016 | Park et al. |
| 2016/0154855 A1 | 6/2016 | Hsiao et al. |
| 2016/0171067 A1 | 6/2016 | Acker |
| 2016/0232230 A1 | 8/2016 | Radivojevic |
| 2016/0239272 A1 | 8/2016 | Petri |
| 2016/0283555 A1 | 9/2016 | Alves et al. |
| 2016/0283610 A1 | 9/2016 | Simitsis et al. |
| 2016/0306827 A1 | 10/2016 | Dos Santos et al. |
| 2016/0328432 A1 | 11/2016 | Raghunathan |
| 2017/0024912 A1 | 1/2017 | De Castro et al. |
| 2017/0075693 A1 | 3/2017 | Bishop et al. |
| 2017/0075726 A1 | 3/2017 | Park et al. |
| 2017/0116289 A1 | 4/2017 | Deshmukh et al. |
| 2017/0228253 A1 | 8/2017 | Layman et al. |
| 2017/0322838 A1 | 11/2017 | Winters et al. |
| 2017/0339203 A1 | 11/2017 | Kekre et al. |
| 2018/0046511 A1 | 2/2018 | Park et al. |
| 2018/0074870 A1 | 3/2018 | Park et al. |
| 2018/0075046 A1 | 3/2018 | Park et al. |
| 2018/0075099 A1 | 3/2018 | Park et al. |
| 2018/0075100 A1 | 3/2018 | Park et al. |
| 2018/0075107 A1 | 3/2018 | Park et al. |
| 2018/0075125 A1 | 3/2018 | Stiel et al. |
| 2018/0075163 A1 | 3/2018 | Park et al. |
| 2018/0181622 A1 | 6/2018 | Deshmukh et al. |

(56) References Cited

U.S. PATENT DOCUMENTS

| | | | |
|---|---|---|---|
| 2018/0186183 A1 | 7/2018 | Hsiao et al. | |
| 2018/0218522 A1 | 8/2018 | De Castro Alves et al. | |
| 2018/0246935 A1 | 8/2018 | Toillion et al. | |
| 2018/0246936 A1 | 8/2018 | Srinivasan et al. | |

FOREIGN PATENT DOCUMENTS

| | | | |
|---|---|---|---|
| CN | 104885077 | | 9/2015 |
| CN | 104937591 | | 9/2015 |
| CN | 105074698 | | 11/2015 |
| CN | 105308592 | | 2/2016 |
| CN | 105379183 | | 3/2016 |
| CN | 105593854 | | 5/2016 |
| EP | 1241589 | | 9/2002 |
| EP | 2474922 | | 7/2012 |
| EP | 2946314 | | 11/2015 |
| EP | 2946527 | | 11/2015 |
| EP | 2959408 | | 12/2015 |
| JP | 2002-251233 | A | 9/2002 |
| JP | 2006338432 | | 12/2006 |
| JP | 2007513426 | | 5/2007 |
| JP | 2007-328716 | A | 12/2007 |
| JP | 2008-541225 | A | 11/2008 |
| JP | 2009-134689 | A | 6/2009 |
| JP | 2009171193 | | 7/2009 |
| JP | 2010-108073 | A | 5/2010 |
| JP | 2011-039818 | A | 2/2011 |
| JP | 2011039820 | | 2/2011 |
| JP | 2011059967 | | 3/2011 |
| JP | 2011518359 | | 6/2011 |
| JP | 2015536001 | | 12/2015 |
| JP | 2016500167 | | 1/2016 |
| JP | 2016500168 | | 1/2016 |
| JP | 2016503216 | | 2/2016 |
| JP | 2016504679 | | 2/2016 |
| WO | 0049533 | | 8/2000 |
| WO | 2001018712 | | 3/2001 |
| WO | 0159602 | | 8/2001 |
| WO | 0165418 | | 9/2001 |
| WO | 03030031 | | 4/2003 |
| WO | 2007122347 | | 11/2007 |
| WO | WO2009/119811 | A1 | 10/2009 |
| WO | 2010050582 | | 5/2010 |
| WO | 2011142026 | | 11/2011 |
| WO | 2012037511 | | 3/2012 |
| WO | 2012050582 | | 4/2012 |
| WO | 2012154408 | | 11/2012 |
| WO | 2012158360 | | 11/2012 |
| WO | 2014000819 | | 1/2014 |
| WO | 2015191120 | | 12/2015 |
| WO | 2016048912 | | 3/2016 |
| WO | 2018169429 | | 9/2018 |
| WO | 2018169430 | | 9/2018 |

OTHER PUBLICATIONS

Wikipedia contributors. "Pig (programming tool)." Wikipedia, The Free Encyclopedia. Wikipedia, The Free Encyclopedia, Apr. 19, 2016. Web. May 6, 2016.*
Yang et al, Map-Reduce-Merge: Simplified Relational Data Processing on Large Clusters, 2007.*
Olston et al, Pig Latin: A Not-So-Foreign Language for Data Processing, 2008.*
U.S. Appl. No. 12/949,081, Non-Final Office Action dated Jan. 28, 2015, 20 pages.
U.S. Appl. No. 12/957,201, Notice of Allowance dated Jan. 21, 2015, 5 pages.
U.S. Appl. No. 13/107,742, Final Office Action dated Jan. 21, 2015, 23 pages.
U.S. Appl. No. 13/177,748, Non-Final Office Action dated Feb. 3, 2015, 22 pages.
U.S. Appl. No. 13/770,961, Non-Final Office Action dated Feb. 4, 2015, 22 pages.
U.S. Appl. No. 13/770,969, Notice of Allowance dated Jan. 22, 2015, 5 pages.
U.S. Appl. No. 13/829,958, Non-Final Office Action dated Dec. 11, 2014, 15 pages.
U.S. Appl. No. 13/906,162, Non-Final Office Action dated Dec. 29, 2014, 10 pages.
International Application No. PCT/US2014/010832, Written Opinion dated Dec. 15, 2014, 5 pages.
International Application No. PCT/US2014/010920, International Search Report and Written Opinion dated Dec. 15, 2014, 10 pages.
International Application No. PCT/US2014/017061, Written Opinion dated Feb. 3, 2015, 6 pages.
International Application No. PCT/US2014/039771, International Search Report and Written Opinion dated Sep. 24, 2014, 12 pages.
China Patent Office office actions for patent application CN201280022008.7 (dated Dec. 3, 2015).
European Application No. 12783063.6, Office Action dated Nov. 11, 2015, 8 pages.
Notice of Allowance for U.S. Appl. No. 12/548,187, dated Feb. 2, 2016, 15 pages.
Notice of Allowance for U.S. Appl. No. 14/037,072 dated Feb. 16, 2016, 17 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Non-Final Office Action for U.S. Appl. No. 13/827,631 dated Feb. 11, 2016, 12 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 pages.
"11 Oracle Event Processing NoSQL 1-20 Database Data Cartridge— IIg Release 1 (11.1.1.7) 11," Oracle Fusion Middleware CQL Language Reference for Oracle Event Processing 11g Release 1 (11.1.1.7), 4 pages (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Cranor et al., Gigascope: a stream database for network applications, Proceedings of the 2003 Acm Sigmod International Conference on Management of Data ' SIGMOD '03, Jun. 9, 2003, pp. 647-651.
De Castro Alves, A General Extension System for Event Processing Languages, DEBS '11, New York, NY, USA, Jul. 11-15, 2011, pp. 1-9.
European Application No. 12783063.6, Extended European Search Report dated Mar. 24, 2015, 6 pages.

(56) References Cited

OTHER PUBLICATIONS

International Application No. PCT/US2014/068641, International Search Report and Written Opinion dated Feb. 26, 2015, 11 pages.
Oracle® Complex Event Processing EPL Language Reference 11g Release 1 (11.1.1.4.0), E14304-02, Jan. 2011, 80 pages.
Takenaka et al., A scalable complex event processing framework for combination of SQL-based continuous queries and C/C++ functions, FPL 2012, Oslo, Norway, Aug. 29-31, 2012, pp. 237-242.
Tomàs et al., RoSeS: A Continuous Content-Based Query Engine for RSS Feeds, DEXA 2011, Toulouse, France, Sep. 2, 2011, pp. 203-218.
U.S. Appl. No. 12/913,636, Non-Final Office Action dated Apr. 1, 2015, 22 pages.
U.S. Appl. No. 13/764,560, Final Office Action dated Apr. 15, 2015, 19 pages.
U.S. Appl. No. 13/827,631, Final Office Action dated Apr. 3, 2015, 11 pages.
U.S. Appl. No. 13/830,129, Non-Final Office Action dated Feb. 27, 2015, 19 pages.
U.S. Appl. No. 13/830,378, Non-Final Office Action dated Feb. 25, 2015, 23 pages.
U.S. Appl. No. 13/839,288, Notice of Allowance dated Apr. 3, 2015, 12 pages.
U.S. Appl. No. 14/077,230, Notice of Allowance dated Apr. 16, 2015, 16 pages.
Final Office Action for U.S. Appl. No. 13/830,759 dated Feb. 18, 2016, 18 pages.
Japan Patent Office office actions JPO patent application JP2014-509315 (dated Mar. 15, 2016).
Notice of Allowance for U.S. Appl. No. 13/770,961 dated Apr. 4, 2016, 8 pages.
Final Office Action for U.S. Appl. No. 13/838,259 dated Feb. 19, 2016, 47 pages.
Notice of Allowance for U.S. Appl. No. 13/906,162 dated Apr. 5, 2016, 7 pages.
Final Office Action for U.S. Appl. No. 14/036,500 dated Mar. 17, 2016, 34 pages.
Final Office Action for U.S. Appl. No. 13/764,560 dated Apr. 14, 2016, 20 pages.
Final Office Action for U.S. Appl. No. 14/621,098 dated Apr. 21, 2016, 16 pages.
Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.
Kitagawa et al., Sensing Network, Information Processing, Information Processing Society of Japan, Sep. 15, 2010, vol. 51, No. 9, pp. 1119-1126.
Hirzel et al., "SPL Stream Processing Language Report", IBM Research Report RC24897 (W0911-044), IBM Research Division, Thomas J. Watson Research center, Yorktown Heights, NY, Nov. 5, 2009, 19 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
International Application No. PCT/US2014/039771, International Search Report and Written Opinion dated Apr. 29, 2015 6 pages.
International Application No. PCT/US2015/016346, International Search Report and Written Opinion dated May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
Bestehorn Fault-tolerant query processing in structured P2P-systems, Springer Science+Business Media LLC Distrib Parallel Databases 28:33-66 (May 8, 2010).
Cooperativesystems: "Combined WLAN and Inertial Indoor Pedestrian Positioning System" URL:https://www.youtube.com/watch?v=mEt88WaHZvU.
Frank et al "Development and Evaluation of a Combined WLAN & Inertial Indoor Pedestrian Positioning System" Proceedings of the $22^{nd}$ International Technical Meeting of the Satellite Division of the Institute of Navigation (ION GNSS 2009). (Sep. 25, 2009) pp. 538-546.
Kramer "Semantics and Implementation of Continuous Sliding Window Queries over Data Streams" ACM Transactions on Database Systems, vol. 34, pp. 4:1 to 4:49 (Apr. 2009).
Final Office Action for U.S. Appl. No. 13/830,428 dated May 26, 2016, 26 pages.
Final Office Action for U.S. Appl. No. 11/601,415 dated May 17, 2016, 17 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.
Final Office Action for U.S. Appl. No. 13/829,958 dated Jun. 30, 2016, 19 pages.
Final Office Action for U.S. Appl. No. 13/830,502 dated Jul. 6, 2016, 28 pages.
International Preliminary Report on Patentabiilty dated Jun. 16, 2016 for PCT/US2014/068641, 7 pages.
International Application No. PCT/RU2015/000468, International Search Report and Written Opinion dated Apr. 25, 2016, 9 pages.
International Application No. PCT/US2015/016346, International Search Report and Written Opinion dated May 24, 2016, 5 pages.
China Patent Office office action for patent application CN201180053021.4 (dated May 27, 2016).
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Final Office Action for U.S. Appl. No. 13/830,781,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.

(56) References Cited

OTHER PUBLICATIONS

"Strings in C," Swarthmore College, retreived from internet: http://web.cs.swarthmore.edu/~newhall/unixhelp/C_strings.html (Jun. 12, 207) 3 pages.
"Call User Defined Functions from Pig," Amazon Elastic MapReduce Developer Guide (Mar. 2009) 2 pages.
Final Office Action for U.S. Appl. No. 12/548,187 dated Jun. 4, 2014, 63 pages.
Final Office Action for U.S. Appl. No. 12/396,464 dated May 16, 2014, 15 pages.
Final Office Action for U.S. Appl. No. 13/089,556 dated Jun. 13, 2014, 13 pages.
U.S. Appl. No. 13/177,748, Final Office Action dated Mar. 20, 2014, 23 pages.
PCT Patent Application No. PCT/US2014/010832, International Search Report dated Apr. 3, 2014, 9 pages.
Harish et al., "Identifying Robust Plans through Plan Diagram Reduction", PVLDB '08, Auckland, New Zealand, Aug. 23-28, 2008,pp. 1124-1140.
Stillger et al., "LEO-DB2's LEarning Optimizer", Proc. of the VLDB, Roma, Italy, Sep. 2001, pp. 19-28.
Rao et al., "Compiled Query Execution Engine using JVM", ICDE '06, Atlanta, GA, Apr. 3-7, 2006, 12 pages.
Microsoft Computer Dictionary, 5th Edition, Microsoft Press, Redmond, WA, © 2002, pp. 238-239 and 529.
"Bottom-up parsing", Wikipedia, downloaded from: http://en.wikipedia.org/wiki/Bottom-up_parsing on Sep. 8, 2014, pp. 1-2.
"Branch Predication", Wikipedia, downloaded from: http://en.wikipedia.org/wiki/Branch_predication on Sep. 8, 2014, pp. 1-4.
Dewson Beginning SQL Server 2008 for Developers: From Novice to Professional, A Press, Berkeley, CA, © 2008, pp. 337-349 and 418-438.
Balkesen et al. "Scalable Data Partitioning Techniques for Parallel Sliding Window Processing over Data Streams," 8th International Workshop on Data Management for Sensor Networks (Aug. 2011).
Cadonna et al., Efficient event pattern matching with match windows, Proceedings of the 18$^{th}$ ACM SIGKDD international conference on knowledge discovery and data mining (Aug. 2012), pp. 471-479.
Shah et al., Flux: an adaptive partitioning operator for continuous query systems, Proceedings of the 19th International Conference on Data Engineering, Mar. 5-8, 2003, pp. 25-36.
Ray et al., Optimizing complex sequence pattern extraction using caching, data engineering workshops (ICDEW) 2011 IEEE 27th international conference on IEEE, Apr. 11, 2011, pp. 243-248.
Abadi et al., Aurora: a new model and architecture for data stream management, the VLDB Journal the International Journal on very large data bases, vol. 12, No. 2, Aug. 1, 2003, pp. 120-139.
Chandrasekaran et al., PSoup: a system for streaming queries over streaming data, The VLDB Journal, The International Journal on very large data bases, vol. 12, No. 2, Aug. 1, 2003, pp. 140-156.
Krämer, Continuous Queries Over Data Streams—Semantics and Implementation, Fachbereich Mathematik and Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
Nichols et al., A faster closure algorithm for pattern matching in partial-order event data, IEEE International Conference on Parallel and Distributed Systems (Dec. 2007), pp. 1-9.
"Pattern Recognition With MATCH_ Recognize," Oracle™ Complex Event Processing CQL Language Reference, 11g Release 1 (11.1.1) E12048-01, May 2009, pp. 15-1 to 15-20.
"Supply Chain Event Management: Real-Time Supply Chain Event Management," product information Manhattan Associates (copyright 2009-2012) one page.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.

Chandramouli et al. "High-Performance Dynamic Pattern Matching over Disordered Streams," Proceedings of the VLDB Endowment, vol. 3 Issue 1-2, pp. 220-231 (Sep. 2010).
Chapple "Combining Query Results with the Union Command," ask.com Computing Databases, downloaded from: http://databases.about.com/od/sql/a/union.htm (no date, printed on Oct. 14, 2013).
Complex Event Processing in the Real World, An Oracle White Paper, Sep. 2007, 13 pages.
Coral8 Complex Event Processing Technology Overview, Coral8, Inc., Make it Continuous, Copyright 2007 Coral8, Inc., 2007, pp. 1-8.
Creating WebLogic Domains Using the Configuration Wizard, BEA Products, Version 10.0, Dec. 2007, 78 pages.
Creating Weblogic Event Server Applications, BEA WebLogic Event Server, Version. 2.0, Jul. 2007, 90 pages.
Dependency Injection, Dec. 30, 2008, pp. 1-7.
Deploying Applications to WebLogic Server, Mar. 30, 2007, 164 pages.
Developing Applications with Weblogic Server, Mar. 30, 2007, 254 pages.
EPL Reference, Jul. 2007, 82 pages.
Esper Reference Documentation Version 3.1.0, EsperTech, retrieved from internet at URL: http://espercodehaus.org/esper-3.1.0/doc/reference/en/pdf/esper_reference.pdf, 2009, 293 pages.
Esper Reference Documentation, Copyright 2007, Ver. 1.12.0, 2007, 158 pages.
Esper Reference Documentation, Copyright 2008, ver. 2.0.0, 2008, 202 pages.
Fantozzi "A Strategic Approach to Supply Chain Event Management," student submission for Masters Degree, Massachusetts Institute of Technology (Jun. 2003) 36 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs100/quickstart/quick_start. html, May 10, 2010, 1 page.
Getting Started with WebLogic Event Server, BEA WebLogic Event Server version 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Komazec et al. "Towards Efficient Schema-Enhanced Pattern Matching over RDF Data Streams," Proceedings of the 1st International Workshop on Ordering and Reasoning (OrdRing 2011), Bonn, Germany, (Oct. 2011).
Managing Server Startup and Shutdown, BEA WebLogic Server, ver. 10.0, Mar. 30, 2007, 134 pages.
Matching Behavior, .NET Framework Developer's Guide, Microsoft Corporation, Retrieved on: Jul. 1, 2008, URL: http://msdn.microsoft.com/en-us/library/Oyzc2ybO(printer).aspx, 2008, pp. 1-2.
New Project Proposal for Row Pattern Recognition—Amendment to SQL with Application to Streaming Data Queries, H2-2008-027, H2 Teleconference Meeting, Jan. 9, 2008, pp. 1-6.
Ogrodnek "Custom UDFs and hive," Bizo development blog http://dev.bizo.com (Jun. 23, 3009) 2 pages.
Oracle Application Server 10g, Release 2 and 3, New Features Overview, An Oracle White Paper, Oracle., Oct. 2005, 48 pages.
Oracle Application Server, Administrator's Guide, 10g Release 3 (10.1.3.2.0), B32196-01, Oracle, Jan. 2007, 376 pages.
Oracle Application Server, Enterprise Deployment Guide, 10g Release 3 (10.1.3.2.0), B32125-02, Oracle, Apr. 2007, 120 pages.
Oracle CEP Getting Started, Release 11 gR1 (11.1.1) E14476-01, May 2009, 172 pages.
Oracle Complex Event Processing CQL Language Reference, 11g Release 1 (11.1.1) E12048-03, Apr. 2010, 540 pages.

(56) References Cited

OTHER PUBLICATIONS

Oracle Database Data Cartridge Developer's Guide, B28425-03, 11 g Release 1 (11.1), Oracle, Mar. 2008, 372 pages.
Oracle Database, SQL Language Reference 11 g Release 1 (11.1), B28286-02, Oracle, Sep. 2007, 1496 pages.
Oracle Database, SQL Reference, 10g Release 1 (10.1), Part No. B10759-01, Dec. 2003, 7-1 to 7-17; 7-287 to 7-290; 14-61 to 14-74.
Oracle™ Complex Event Processing CQL Language Reference, 11g Release 1 (11.1.1.4.0) E12048-04,(Jan. 2011), pages title page, iii-xxxviii, 1-1 to 4-26, 6-1 to 6-12, 18-1 to 20-26, Index-1 to Index-14.
Oracle™ Fusion Middleware CQL Language Reference, 11g Release 1 (11.1.1.6.3) E12048-10, (Aug. 2012) pages: title page, iii-xxxvi, 1-1 to 4-26, 6-1 to 6-12, 18-1 to 20-26, Index-1 to Index-14.
OSGI Service Platform Core Specification, The OSGI Alliance, OSGI Alliance, Apr. 2007, 288 pages.
Pradhan "Implementing and Configuring SAP® Event Management" Galileo Press, pp. 17-21 (copyright 2010).
Release Notes, BEA WebLogic Event Server, Ver. 2.0, Jul. 2007, 8 pages.
Spring Dynamic Modules for OSGi Service Platforms product documentation, Jan. 2008, 71 pages.
SQL Tutorial-In, Tizag.com, http://web.archive.org/web/20090216215219/http://www.tizag.com/sgiTutorial/sqlin.php,, Feb. 16, 2009, pp. 1-3.
Stream Base New and Noteworthy, Stream Base, Jan. 12, 2010, 878 pages.
Stream Query Repository: Online Auctions, at URL: http://www-db.stanford.edu/stream/sqr/onauc.html#queryspecsend, Dec. 2, 2002, 2 pages.
Stream: The Stanford Stream Data Manager, Retrieved from: URL: http://infolab.stanford.edu/stream/, Jan. 5, 2006, pp. 1-9.
The Stanford Stream Data Manager, IEEE Data Engineering Bulletin, Mar. 2003, pp. 1-8.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.
WebSphere Application Server V6.1 Problem Determination: IBM Redpaper Collection, Dec. 2007, 634 pages.
What is BPM? Datasheet [online]. IBM, [retrieved on Jan. 28, 2013]. Retrieved from the Internet: <URL: http://www-01.ibm.com/software/info/bpm/whatis-bpm/>.
Wilson "SAP Event Management, an Overview," Q Data USA, Inc.( copyright 2009) 16 pages.
Non-Final Office Action for U.S. Appl. No. 13/107,742 dated Jun. 19, 2014, 20 pages.
Non-Final Office Action for U.S. Appl. No. 12/913,636 dated Jul. 24, 2014, 21 pages.
Non-Final Office Action for U.S. Appl. No. 12/957,201 dated Jul. 30, 2014, 12 pages.
Non-Final Office Action for U.S. Appl. No. 13/770,969 dated Aug. 7, 2014, 9 pages.
Final Office Action for U.S. Appl. No. 12/548,281 dated Aug. 13, 2014, 19 pages.
Notice of Allowance for U.S. Appl. No. 12/396,464 dated Sep. 3, 2014, 7 pages.
International Search Report and Written Opinion dated Mar. 14, 2014 for PCT/US2013/073086.
Non-Final Office Action for U.S. Appl. No. 14/302,031 dated Aug. 27, 2014, 19 pages.
Non-Final Office Action for U.S. Appl. No. 13/764,560 dated Sep. 12, 2014, 23 pages.
U.S. Appl. No. 10/948,523, Final Office Action dated Jul. 6, 2007, 37 pages.
Advisory Action for U.S. Appl. No. 12/548,187 dated Sep. 26, 2014, 6 pages.
International Search Report and Written Opinion dated Jul. 16, 2014 for PCT/US2013/062047.
International Search Report and Written Opinion dated Sep. 12, 2014 for PCT/US2014/017061.
International Search Report and Written Opinion dated Jul. 2, 2014 for PCT/US2013/062050.
International Search Report and Written Opinion dated Jul. 3, 2014 for PCT/US2013/062052.
U.S. Appl. No. 10/948,523, Non-Final Office Action dated Dec. 11, 2007, 48 pages.
U.S. Appl. No. 10/948,523, Notice of Allowance dated Dec. 1, 2008, 17 pages.
U.S. Appl. No. 10/948,523, Notice of Allowance dated Jul. 8, 2008, 28 pages.
U.S. Appl. No. 10/948,523, Office Action dated Janaury 22, 2007, 32 pages.
U.S. Appl. No. 10/948,523, Supplemental Notice of Allowance dated Jul. 17, 2008, 4 pages.
U.S. Appl. No. 10/948,523, Supplemental Notice of Allowance dated Aug. 25, 2008, 3 pages.
Non-Final Office Action for U.S. Appl. No. 11/601,415 dated Dec. 11, 2013, 57 pages.
U.S. Appl. No. 11/601,415, Final Office Action dated May 27, 2009, 26 pages.
U.S. Appl. No. 11/601,415, Final Office Action dated Jul. 2, 2012, 58 pages.
U.S. Appl. No. 11/601,415, Final Office Action dated Jun. 30, 2010, 45 pages.
U.S. Appl. No. 11/601,415, Non-Final Office Action dated Sep. 17, 2008, 10 pages.
U.S. Appl. No. 11/601,415, Non-Final Office Action dated Nov. 30, 2009, 32 pages.
U.S. Appl. No. 11/601,415, Office Action dated Dec. 9, 2011, 44 pages.
U.S. Appl. No. 11/873,407, Final Office Action dated Apr. 26, 2010, 11 pages.
U.S. Appl. No. 11/873,407, Non-Final Office Action dated Nov. 13, 2009, 7 pages.
U.S. Appl. No. 11/873,407, Notice of Allowance dated Nov. 10, 2010, 14 pages.
U.S. Appl. No. 11/873,407, Notice of Allowance dated Mar. 7, 2011, 8 pages.
U.S. Appl. No. 11/874,197, Final Office Action dated Aug. 12, 2011, 21 pages.
U.S. Appl. No. 11/874,197, Final Office Action dated Jun. 29, 2010, 17 pages.
U.S. Appl. No. 11/874,197, Non-Final Office Action dated Dec. 22, 2010, 22 pages.
U.S. Appl. No. 11/874,197, Office Action dated Nov. 10, 2009, 14 pages.
U.S. Appl. No. 11/874,202, Final Office Action dated Jun. 8, 2010, 18 pages.
U.S. Appl. No. 11/874,202, Non-Final Office Action dated Dec. 3, 2009, 15 pages.
U.S. Appl. No. 11/874,202, Notice of Allowance dated Mar. 31, 2011, 9 pages.
U.S. Appl. No. 11/874,202, Notice of Allowance dated Dec. 22, 2010, 13 pages.
U.S. Appl. No. 11/874,850, Notice of Allowance dated Jan. 27, 2010, 11 pages.
U.S. Appl. No. 11/874,850, Notice of Allowance dated Nov. 24, 2009, 12 pages.
U.S. Appl. No. 11/874,850, Notice of Allowance dated Dec. 11, 2009, 5 pages.
U.S. Appl. No. 11/874,896, Final Office Action dated Jul. 23, 2010, 28 pages.
U.S. Appl. No. 11/874,896, Non-Final Office Action dated Dec. 8, 2009, 15 pages.
U.S. Appl. No. 11/874,896, Non-Final Office Action dated Nov. 22, 2010, 25 pages.
U.S. Appl. No. 11/874,896, Notice of Allowance dated Jun. 23, 2011, 5 pages.
U.S. Appl. No. 11/927,681, Non-Final Office Action dated Mar. 24, 2011, 14 pages.

(56) References Cited

OTHER PUBLICATIONS

U.S. Appl. No. 11/927,681, Notice of Allowance dated Jul. 1, 2011, 8 pages.
U.S. Appl. No. 11/927,683, Final Office Action dated Sep. 1, 2011, 18 pages.
U.S. Appl. No. 11/927,683, Non-Final Office Action dated Mar. 24, 2011, 10 pages.
U.S. Appl. No. 11/927,683, Notice of Allowance dated Nov. 9, 2011, 7 pages.
U.S. Appl. No. 11/977,437, Final Office Action dated Apr. 8, 2010, 18 pages.
U.S. Appl. No. 11/977,437, Non-Final Office Action dated Oct. 13, 2009, 9 pages.
U.S. Appl. No. 11/977,437, Notice of Allowance dated Jul. 10, 2013, 10 pages.
U.S. Appl. No. 11/977,437, Notice of Allowance dated Mar. 4, 2013, 9 pages.
U.S. Appl. No. 11/977,437, Office Action dated Aug. 3, 2012, 16 pages.
U.S. Appl. No. 11/977,439, Non-Final Office Action dated Apr. 13, 2010, 7 pages.
U.S. Appl. No. 11/977,439, Notice of Allowance dated Mar. 16, 2011, 10 pages.
U.S. Appl. No. 11/977,439, Notice of Allowance dated Aug. 18, 2010, 11 pages.
U.S. Appl. No. 11/977,439, Notice of Allowance dated Sep. 28, 2010, 6 pages.
U.S. Appl. No. 11/977,439, Notice of Allowance dated Nov. 24, 2010, 8 pages.
U.S. Appl. No. 11/977,440, Notice of Allowance dated Oct. 7, 2009, 6 pages.
U.S. Appl. No. 12/395,871, Non-Final Office Action dated May 27, 2011, 7 pages.
U.S. Appl. No. 12/395,871, Notice of Allowance dated May 4, 2012, 5 pages.
U.S. Appl. No. 12/395,871, Office Action dated Oct. 19, 2011, 8 pages.
U.S. Appl. No. 12/396,008, Non-Final Office Action dated Jun. 8, 2011, 9 pages.
U.S. Appl. No. 12/396,008, Notice of Allowance dated Nov. 16, 2011, 5 pages.
Non-Final Office Action for U.S. Appl. No. 12/396,464 dated Dec. 31, 2013, 15 pages.
U.S. Appl. No. 12/396,464, Final Office Action dated Jan. 16, 2013, 16 pages.
U.S. Appl. No. 12/396,464, Non-Final Office Action dated Sep. 7, 2012, 17 pages.
U.S. Appl. No. 12/506,891, Notice of Allowance dated Jul. 25, 2012, 8 pages.
U.S. Appl. No. 12/506,891, Office Action dated Dec. 14, 2011, 17 pages.
U.S. Appl. No. 12/506,905, Notice of Allowance dated Dec. 14, 2012, 8 pages.
U.S. Appl. No. 12/506,905, Office Action dated Aug. 9, 2012, 33 pages.
U.S. Appl. No. 12/506,905, Office Action dated Mar. 26, 2012, 60 pages.
U.S. Appl. No. 12/534,384, Notice of Allowance dated May 7, 2013, 11 pages.
U.S. Appl. No. 12/534,384, Office Action dated Feb. 28, 2012, 12 pages.
U.S. Appl. No. 12/534,384, Office Action dated Feb. 12, 2013, 13 pages.
U.S. Appl. No. 12/534,398, Final Office Action dated Jun. 5, 2012, 16 pages.
U.S. Appl. No. 12/534,398, Notice of Allowance dated Nov. 27, 2012, 9 pages.
U.S. Appl. No. 12/534,398, Office Action dated Nov. 1, 2011, 14 pages.
U.S. Appl. No. 12/548,187, Final Office Action dated Jun. 10, 2013, 17 pages.
U.S. Appl. No. 12/548,187, Non Final Office Action dated Sep. 27, 2011, 17 pages.
U.S. Appl. No. 12/548,187, Non-Final Office Action dated Apr. 9, 2013, 17 pages.
U.S. Appl. No. 12/548,187, Office Action dated Jun. 20, 2012, 31 pages.
U.S. Appl. No. 12/548,209, Notice of Allowance dated Oct. 24, 2012, 12 pages.
U.S. Appl. No. 12/548,209, Office Action dated Apr. 16, 2012, 16 pages.
U.S. Appl. No. 12/548,222, Non-Final Office Action dated Apr. 10, 2013, 16 pages.
U.S. Appl. No. 12/548,222, Non-Final Office Action dated Oct. 19, 2011, 17 pages.
U.S. Appl. No. 12/548,222, Notice of Allowance dated Jul. 18, 2013, 12 pages.
U.S. Appl. No. 12/548,222, Office Action dated Jun. 20, 2012, 20 pages.
U.S. Appl. No. 12/548,281, Final Office Action dated Oct. 10, 2013, 21 pages.
U.S. Appl. No. 12/548,281, Non-Final Office Action dated Apr. 12, 2013, 16 pages.
U.S. Appl. No. 12/548,281, Non-Final Office Action dated Oct. 3, 2011, 18 pages.
U.S. Appl. No. 12/548,281, Office Action dated Jun. 20, 2012, 29 pages.
U.S. Appl. No. 12/548,290, Final Office Action dated Jul. 30, 2012, 21 pages.
U.S. Appl. No. 12/548,290, Non-Final Office Action dated Oct. 3, 2011, 15 pages.
U.S. Appl. No. 12/548,290, Non-Final Office Action dated Apr. 15, 2013, 17 pages.
U.S. Appl. No. 12/548,290, Notice of Allowance dated Sep. 11, 2013, 6 pages.
U.S. Appl. No. 11/874,197, Notice of Allowance dated Jun. 22, 2012, 20 pages.
U.S. Appl. No. 12/913,636, Final Office Action dated Jan. 8, 2013, 21 pages.
U.S. Appl. No. 12/913,636, Office Action dated Jun. 7, 2012.
U.S. Appl. No. 12/949,081, Final Office Action dated Aug. 27, 2013, 12 pages.
U.S. Appl. No. 12/949,081, Non-Final Office Action dated Jan. 9, 2013, 12 pages.
U.S. Appl. No. 12/957,194, Non-Final Office Action dated Dec. 7, 2012, 11 pages.
U.S. Appl. No. 12/957,194, Notice of Allowance dated Mar. 20, 2013, 9 pages.
U.S. Appl. No. 12/957,201, Final Office Action dated Apr. 25, 2013, 10 pages.
U.S. Appl. No. 12/957,201, Office Action dated Dec. 19, 2012, 13 pages.
Notice of Allowance for U.S. Appl. No. 13/089,556 dated Oct. 6, 2014, 9 pages.
Non-Final Office Action for U.S. Appl. No. 13/089,556 dated Jan. 9, 2014, 13 pages.
U.S. Appl. No. 13/089,556, Final Office Action dated Aug. 29, 2013, 10 pages.
U.S. Appl. No. 13/089,556, Non-Final Office Action dated Apr. 10, 2013, 9 pages.
U.S. Appl. No. 13/089,556, Office Action dated Nov. 6, 2012, 12 pages.
U.S. Appl. No. 13/102,665, Final Office Action dated Jul. 9, 2013, 16 pages.
U.S. Appl. No. 13/102,665, Office Action dated Feb. 1, 2013, 13 pages.
U.S. Appl. No. 13/107,742, Final Office Action dated Jul. 3, 2013, 19 pages.
U.S. Appl. No. 13/107,742, Non-Final Office Action dated Feb. 14, 2013, 16 pages.
U.S. Appl. No. 13/177,748, Non-Final Office Action dated Aug. 30, 2013, 23 pages.

(56) References Cited

OTHER PUBLICATIONS

U.S. Appl. No. 13/184,528, Notice of Allowance dated Mar. 1, 2012, 16 pages.
U.S. Appl. No. 13/193,377, Notice of Allowance dated Aug. 30, 2013, 18 pages.
U.S. Appl. No. 13/193,377, Office Action dated Jan. 17, 2013, 24 pages.
U.S. Appl. No. 13/193,377, Office Action dated Aug. 23, 2012, 20 pages.
U.S. Appl. No. 13/244,272, Notice of Allowance dated Aug. 12, 2013, 12 pages.
U.S. Appl. No. 13/244,272, Final Office Action dated Mar. 28, 2013, 29 pages.
U.S. Appl. No. 13/244,272, Office Action dated Oct. 4, 2012, 29 pages.
Non-Final Office Action for U.S. Appl. No. 12/548,187 dated Feb. 6, 2014, 53 pages.
Non-Final Office Action for U.S. Appl. No. 12/548,281 dated Feb. 13, 2014, 19 pages.
Agrawal et al. "Efficient pattern matching over event streams," Proceedings of the 2008 ACM SIGMOD international conference on Management of data, pp. 147-160 (Jun. 2008).
Abadi et al., Yes Aurora: A Data Stream Management System, International Conference on Management of Data, Proceedings of the 2003 ACM SIGMOD International Conference on Management of Data, 2003, 4 pages.
Aho et al., Efficient String Matching: An Aid to Bibliographic Search, Communications of the ACM, vol. 18, No. 6, Association for Computing Machinery, Inc., Jun. 1975, pp. 333-340.
Arasu et al., An Abstract Semantics and Concrete Language for Continuous Queries over Streams and Relations, 9th International Workshop on Database programming languages, Sep. 2003, 12 pages.
Arasu et al., CQL: A language for Continuous Queries over Streams and Relations, Lecture Notes in Computer Science vol. 2921, 2004, pp. 1-19.
Arasu et al., STREAM: The Stanford Data Stream Management System, Department of Computer Science, Stanford University, 2004, page 21.
Arasu et al., The CQL Continuous Query Language: Semantic Foundations and Query Execution, Stanford University, The VLDB Journal—The International Journal on Very Large Data Bases, vol. 15, No. 2, Springer-Verlag New York, Inc, Jun. 2006, pp. 1-32.
Avnur et al., Eddies: Continuously Adaptive Query Processing, In Proceedings of the 2000 ACM SIGMOD International Conference on Data, Dallas TX, May 2000, 12 pages.
Avnur et al. , Eddies: Continuously Adaptive Query Processing, 2007, 4 pages.
Babcock et al., Models and Issues in Data Streams, Proceedings of the 21st ACM SIGMOD-SIGACT-SIDART symposium on Principles database systems, 2002, 30 pages.
Babu et al., Continuous Queries over Data Streams, SIGMOD Record, vol. 30, No. 3, Sep. 2001, pp. 109-120.
Bai et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose et al., A Query Algebra for Fragmented XML Stream Data, 9th International Conference on Data Base Programming Languages (DBPL), Sep. 2003, 11 pages.
Buza , Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sglteam.comitemprint.asp?ItemID=979, Oct. 12, 2000, 4 pages.
Chan et al., Efficient Filtering of XML documents with Xpath expressions, 2002, pp. 354-379.
Chandrasekaran et al., TelegraphCQ: Continuous Dataflow Processing for an UncertainWorld, Proceedings of CIDR, 2003, 12 pages.
Chen et al., NiagaraCQ: A Scalable Continuous Query System for Internet Databases, Proceedings of the 2000 SIGMOD International Conference on Management of Data, May 2000, pp. 379-390.
Colyer et al. , Spring Dynamic Modules Reference Guide, Copyright, ver. 1.0.3, 2006-2008, 73 pages.
Colyer et al. , Spring Dynamic Modules Reference Guide, Ver. 1.1.3, 2006-2008, 96 pages.
Conway, An Introduction to Data Stream Query Processing, Truviso, Inc., May 24, 2007, 71 pages.
Demers et al., Towards Expressive Publish/Subscribe Systems, Proceedings of the 10th International Conference on Extending Database Technology (EDBT 2006), Munich, Germany, Mar. 2006, pp. 1-18.
Demichiel et al., JSR 220: Enterprise JavaBeans™, EJB 3.0 Simplified API, EJB 3.0 Expert Group, Sun Microsystems, Ver. 3.0, May 2, 2006, 59 pages.
Deshpande et al., Adaptive Query Processing, Slide show believed to be prior to Oct. 17, 2007, 27 pages.
Diao et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez et al., Build your own XQuery processor, slide show, at URL: http://www.galaxquery.org/slides/edbt-summer-school2004.pdf, 2004, 116 pages.
Fernandez et al., Implementing XQuery 1.0: The Galax Experience, Proceedings of the 29th VLDB Conference, Berlin, Germany, 2003, 4 pages.
Florescu et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab et al., Issues in Data Stream Management, ACM SIGMOD Record, vol. 32, issue 2, ACM Press, Jun. 2003, pp. 5-14.
Golab et al., Sliding Window Query Processing Over Data Streams, Aug. 2006, 182 pages.
Gosling et al. , The Java Language Specification, 1996-2005, 684 pages.
Hao et al., Achieving high performance web applications by service and database replications at edge servers, Performance Computing and communications conference(IPCCC) IEEE 28th International, IEEE, Piscataway, NJ, USA, 2009, pp. 153-160.
Hopcroft , Introduction to Automata Theory, Languages, and Computation, Second Edition, Addison-Wesley, Copyright 2001, 524 pages.
Hulten et al., Mining Time-Changing Data Stream, Proceedings of the Seventh ACM SIGKDD International Conference on Knowledge Discovery and Data Mining., Aug. 2001, 10 pages.
Jin et al., ARGUS: Efficient Scalable Continuous Query Optimization for Large-Volume Data Streams, 10th International Database Engineering and Applications Symposium (IDEAS'06), 2006, 7 pages.
Kawaguchi et al., Java Architecture for XML Binding (JAXB) 2.2, Sun Microsystems, Inc., Dec. 10, 1999, 384 pages.
Knuth et al., Fast Pattern Matching in Strings, Siam J Comput. vol. 6(2), Jun. 1977, pp. 323-50.
Lakshmanan et al., On efficient matching of streaming XML documents and queries, 2002, 18 pages.
Lindholm et al., Java Virtual Machine Specification, 2nd Edition Prentice Hall, Apr. 1999, 484 pages.
Liu et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP? , Complex Event Processing, downloaded, at URL:http://complexevents.com/?p=103, Apr. 29, 2011, 5 pages.
Madden et al., Continuously Adaptive Continuous Queries (CACQ) over Streams, SIGMOD 2002, Jun. 4-6, 2002, 12 pages.

(56) References Cited

OTHER PUBLICATIONS

Martin et al., Finding Application Errors and Security Flaws Using PQL, a Program Query Language, OOPSLA'05, Oct. 16, 2005, pp. 1-19.
Motwani et al., Query Processing Resource Management, and Approximation in a Data Stream Management System, Jan. 2003, 12 pages.
Munagala et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah et al., A Cluster-Based TMO-Structured Scalable Approach for Location Information Systems, Object-Oriented Real-Time Dependable Systems, 2003. Words 2003 Fall. Proceedings. Ninth IEEE International Workshop on Date of Conference: Oct. 1-3, 2003, pp. 225-233.
Novick, Creating a User Defined Aggregate with SQL Server 2005, URL: http://novicksoftware.com/Articles/sgl-2005-product-user-defined-aggregate.html, 2005, 6 pages.
International Application No. PCT/US2011/052019, International Search Report and Written Opinion dated Nov. 17, 2011, 55 pages.
International Application No. PCT/US2012/034970, International Search Report and Written Opinion dated Jul. 16, 2012, 13 pages.
International Application No. PCT/US2012/036353, International Search Report and Written Opinion dated Sep. 12, 2012, 11 pages.
Peng et al., Xpath Queries on Streaming Data, 2003, pp. 1-12.
Peterson, Petri Net Theory and the Modeling of Systems, Prentice Hall, 1981, 301 pages.
Postgressql, Documentation: Manuals: PostgresSQL 8.2: User-Defined Aggregates believed to be prior to Apr. 21, 2007, 4 pages.
Sadri et al., Expressing and Optimizing Sequence Queries in Database Systems, ACM Transactions on Database Systems, vol. 29, No. 2, ACM Press, Copyright 2004, Jun. 2004, pp. 282-318.
Sadtler et al., WebSphere Application Server Installation Problem Determination, Copyright 2007, IBM Corp., 2007, pp. 1-48.
Sansoterra, Empower SQL with Java User-Defined Functions, ITJungle. com. , Oct. 9, 2003, 9 pages.
Sharaf et al., Efficient Scheduling of Heterogeneous Continuous Queries, VLDB '06, Sep. 12-15, 2006, pp. 511-522.
Stolze et al., User-defined Aggregate Functions in DB2 Universal Database, Retrieved from: <http://www.128.ibm.com/deve10perworks/db2/library/tachartic1e/0309stolze/0309stolze.html>, Sep. 11, 2003, 11 pages.
Stump et al., Proceedings, The 2006 Federated Logic Conference, IJCAR '06 Workshop, PLPV '06: Programming Languages meets Program Verification., 2006, pp. 1-113.
Terry et al., Continuous queries over append-only database, Proceedings of ACM SIGMOD, 1992, pp. 321-330.
Ullman et al. , Introduction to JDBC, Stanford University, 2005, 7 pages.
Vajjhala et al., The Java Architecture for XML Binding (JAXB) 2.0, Apr. 19, 2006, 384 pages.
Vijayalakshmi et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang et al ., Distributed continuous range query processing on moving objects, DEXA'06 Proceedings of the 17th international conference on Database and Expert Systems Applications, 2006, pp. 655-665.
White et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom et al., CQL: A Language for Continuous Queries over Streams and Relations, Oct. 17, 2007, 62 pages.
Widom et al., The Stanford Data Stream Management System, PowerPoint Presentation, Oct. 17, 2007, 110 pages.
Wu et al., Dynamic Data Management for Location Based Services in Mobile Environments, Database Engineering and Applications Symposium, 2003, Jul. 16, 2003, pp. 172-181.
Zemke, XML Query, Mar. 14, 2004, 29 pages.
Japan Patent Office office actions JPO patent application JP2013-529376 (dated Aug. 18, 2015).
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
U.S. Appl. No. 13/828,640, Final Office Action dated Jun. 17, 2015, 11 pages.
"Oracle Complex Event Processing Exalogic Performance Study" an Oracle White Paper, Sep. 2011, 16 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
Non-Final Office Action for U.S. Appl. No. 13/906,162 dated Oct. 28, 2015, 11 pages.

(56) References Cited

OTHER PUBLICATIONS

Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (dated Oct. 28, 2015).
Notice of Allowance for U.S. Appl. No. 12/913,636 dated Oct. 27, 2015, 22 pages.
Non-Final Office Action for U.S. Appl. No. 13/830,502 dated Dec. 11, 2015, 25 pages.
Final Office Action for U.S. Appl. No. 13/830,378 dated Nov. 5, 2015, 28 pages.
Non-Final Office Action for U.S. Appl. No. 11/601,415 dated Nov. 13, 2015, 18 pages.
Mahlke et al., Comparison of Full and Partial Predicated Execution Support for ILP Processors, ICSA '95, Santa Margherita Ligure, 1995, pp. 138-149.
U.S. Appl. No. 13/829,958 Non-Final Office Action, dated Dec. 27, 2016, 20 pages.
U.S. Appl. No. 13/838,259 Non-Final Office Action, dated Jan. 4, 2017, 65 pages.
U.S. Appl. No. 14/610,971 Non-Final Office Action, dated Dec. 19, 2016, 10 pages.
U.S. Appl. No. 14/621,098 Non-Final Office Action, dated Nov. 14, 2016, 17 pages.
U.S. Appl. No. 15/003,646 Non-Final Office Action, dated Dec. 2, 2016, 9 pages.
U.S. Appl. No. 14/559,550 Non-Final Office Action, dated Jan. 27, 2017, 16 pages.
U.S. Appl. No. 15/015,933 Non-Final Office Action, dated Jan. 30, 2017, 11 pages.
U.S. Appl. No. 13/764,560, Notice of Allowance dated Sep. 30, 2016, 10 pages.
U.S. Appl. No. 13/827,631, Final Office Action dated Oct. 20, 2016, 12 pages.
U.S. Appl. No. 13/830,759, Non-Final Office Action dated Feb. 10, 2017, 23 pages.
U.S. Appl. No. 13/827,631, Non-Final Office Action dated Feb. 16, 2017, 16 pages.
International Application No. PCT/US2015/051268 International Preliminary Report on Patentability dated Dec. 8, 2016, 12 pages.
International Application No. PCT/US2015/016346, International Preliminary Report on Patentability dated Sep. 30, 2016, 6 pages.
PCT Written Opinion dated Aug. 18, 2016 for PCT/US2015/051268, 7 Pages.
U.S. Appl. No. 14/883,815, Notice of Allowance dated Aug. 30, 2016, 13 pages.
U.S. Appl. No. 13/829,958, Final Office Action dated Jun. 26, 2017, 22 pages.
U.S. Appl. No. 13/830,378, Non-Final Office Action dated Jul. 5, 2017, 44 pages.
U.S. Appl. No. 13/830,428, Non-Final Office Action dated Mar. 22, 2017, 25 pages.
U.S. Appl. No. 13/830,502, Non-Final Office Action dated Apr. 7, 2017, 28 pages.
U.S. Appl. No. 13/830,735, Non-Final Office Action dated Apr. 4, 2017, 16 pages.
U.S. Appl. No. 13/838,259, Final Office Action dated Jul. 7, 2017, 69 pages.
U.S. Appl. No. 14/036,500, Non-Final Office Action dated Feb. 9, 2017, 34 pages.
U.S. Appl. No. 14/036,500, Notice of Allowance dated Jun. 30, 2017, 14 pages.
U.S. Appl. No. 14/036,659, Non-Final Office Action dated Jun. 2, 2017, 28 pages.
U.S. Appl. No. 14/559,550, Final Office Action dated Jul. 12, 2017, 21 pages.
U.S. Appl. No. 14/610,971, Notice of Allowance dated Apr. 12, 2017, 11 pages.
U.S. Appl. No. 14/621,098, Notice of Allowance dated May 3, 2017, 9 pages.
U.S. Appl. No. 14/755,088, Non-Final Office Action dated Jun. 14, 2017, 13 pages.
U.S. Appl. No. 14/866,512, Non-Final Office Action dated Apr. 10, 2017, 24 pages.
U.S. Appl. No. 15/003,646, Notice of Allowance dated May 19, 2017, 16 pages.
U.S. Appl. No. 15/015,933, Notice of Allowance dated May 17, 2017, 16 pages.
U.S. Appl. No. 15/177,147, Non-Final Office Action dated Apr. 7, 2017, 12 pages.
U.S. Appl. No. 15/360,650, Non-Final Office Action dated Mar. 9, 2017, 34 pages.
U.S. Appl. No. 15/360,650, Notice of Allowance dated Jul. 24, 2017, 13 pages.
Akama et al., Design and Evaluation of a Data Management System for WORM Data Processing, Journal of Information Processing, Information Processing Society of Japan, vol. 49, No. 2, Feb. 15, 2008, pp. 749-764.
Chinese Application No. 201380056012.X, Office Action dated Jun. 1, 2017, 22 pages (10 pages for the original document and 12 pages for the English translation).
Chinese Application No. 201480030482.3, Office Action dated Feb. 4, 2017, 5 pages.
Japanese Application No. 2015-534676, Office Action dated Jun. 27, 2017, 9 pages.
Sadana, Interactive Scatterplot for Tablets, AVI, https://vimeo.com/97798460), 2014, 2 pages.
U.S. Appl. No. 13/827,631, Final Office Action dated Aug. 30, 2017, 18 pages.
U.S. Appl. No. 13/830,428, Final Office Action dated Oct. 5, 2017, 33 pages.
U.S. Appl. No. 13/830,735, Final Office Action dated Sep. 29, 2017, 16 pages.
U.S. Appl. No. 13/830,759, Notice of Allowance dated Aug. 23, 2017, 14 pages.
U.S. Appl. No. 14/037,153, Non-Final Office Action dated Aug. 2017, 45 pages.
U.S. Appl. No. 14/755,088, Notice of Allowance dated Oct. 11, 2017, 5 pages.
U.S. Appl. No. 14/861,687, Non-Final Office Action dated Oct. 2017, 10 pages.
U.S. Appl. No. 14/866,512, Final Office Action dated Sep. 13, 2017, 25 pages.
U.S. Appl. No. 15/177,147, Non-Final Office Action dated Nov. 3, 2017, 6 pages.
Chinese Application No. 201380056017.2, Office Action dated Jul. 17, 2017, 25 pages (16 pages for the original document and 9 pages for the English translation).
Chinese Application No. 201380056099.0, Office Action dated Jul. 4, 2017, 26 pages (14 pages for the original document and 12 pages for the English translation).
Japanese Application No. 2015-534678, Office Action dated Aug. 29, 2017, 3 pages.
Japanese Application No. 2015-534680, Office Action dated Aug. 22, 2017, 10 pages.
European Patent Application EP14825489.9, Office Action dated Jul. 28, 2017, 7 pages.
U.S. Appl. No. 13/829,958, Non-Final Office Action dated Jan. 8, 2018, 22 pages.
U.S. Appl. No. 13/830,502, Final Office Action dated Nov. 8, 2017, 27 pages.
U.S. Appl. No. 13/830,735, Notice of Allowance dated Jan. 26, 2018, 9 pages.
U.S. Appl. No. 13/838,259, Non-Final Office Action dated Nov. 27, 2017, 69 pages.
U.S. Appl. No. 14/036,659, Notice of Allowance dated Nov. 30, 2017, 13 pages.
U.S. Appl. No. 14/559,550, Notice of Allowance dated Dec. 5, 2017, 6 pages.
U.S. Appl. No. 14/973,377, Non-Final Office Action dated Nov. 30, 2017, 17 pages.

(56) References Cited

OTHER PUBLICATIONS

U.S. Appl. No. 14/866,512, Notice of Allowance dated Feb. 15, 2018, 5 pages.
Chinese Application No. 201480004736.4, Office Action dated Nov. 29, 2017, 13 pages (7 pages of English translation and 6 pages of Original document).
Japanese Application No. 2015-534676, Office Action dated Jan. 23, 2018, 9 pages.
Japanese Application No. 2015-552765, Office Action dated Dec. 5, 2017, 2 pages.
Japanese Application No. 2015-552781, Office Action dated Nov. 21, 2017, 3 pages.
Japanese Application No. 2015-558217, Office Action dated Jan. 9, 2018, 3 pages.
U.S. Appl. No. 13/827,631, Notice of Allowance dated Mar. 13, 2018, 10 pages.
U.S. Appl. No. 13/830,378, Final Office Action dated May 1, 2018, 30 pages.
U.S. Appl. No. 13/830,428, Notice of Allowance dated Apr. 2, 2018, 9 pages.
U.S. Appl. No. 13/830,502, Notice of Allowance dated Apr. 2, 2018, 8 pages.
U.S. Appl. No. 14/037,153, Final Office Action dated May 3, 2018, 16 pages.
U.S. Appl. No. 14/973,377, Notice of Allowance dated May 2, 2018, 8 pages.
U.S. Appl. No. 15/177,147, Notice of Allowance dated Mar. 22, 2018, 7 pages.
U.S. Appl. No. 15/795,121, Non-Final Office Action dated Apr. 6, 2018, 21 pages.
U.S. Patent Application No. 14/861,687, Notice of Allowance dated Jun. 6, 2018, 10 pages.
Chinese Application No. 201380063379.4, Office Action dated Feb. 2, 2018, 13 pages (6 pages of the original document and 7 pages for the English translation).
Chinese Application No. 201480004731.1, Office Action dated Apr. 4, 2018, 13 pages (6 pages of the original document and 7 pages for the English translation).
Chinese Application No. 201480009223.2, Office Action dated Apr. 18, 2018, 18 pages (10 pages of the original document and 8 pages for the English translation).
European Application No. 13776641.6, Office Action dated Apr. 3, 2018, 5 pages.
European Application No. EP13776642.4, Office Action dated May 3, 2018, 5 pages.
European Application No. EP13776643.2, Office Action dated May 3, 2018, 4 pages.
Japanese Application No. 2015-534678, Office Action dated Apr. 24, 2018, 3 pages.
Japanese Application No. JP2016-516778, Office Action dated May 22, 2018, 8 pages.
International Application No. PCT/RU2015/000468, International Preliminary Report on Patentability dated Feb. 8, 2018, 10 pages.
International Application No. PCT/US2014/010832, International Preliminary Report on Patentability dated Apr. 24, 2015, 27 pages.
U.S. Appl. No. 13/829,958, Notice of Allowance dated Jun. 11, 2018, 13 pages.
U.S. Appl. No. 13/830,378, Non-Final Office Action dated Sep. 7, 2018, 27 pages.
U.S. Appl. No. 13/838,259, Final Office Action dated Jun. 14, 2018, 80 pages.
Chinese Application 201380056017.2, Office Action dated May 11, 2018, 8 pages (3 pages for the original document and 5 pages for the English translation).
Chinese Application No. 201380056099.0, Office Action dated Apr. 26, 2018, 8 pages (3 pages for the original document and 5 pages for the English translation).
European Application No. 11761766.2, Office Action dated Sep. 5, 2018, 7 pages.
European Application No. 13776643.2, Office Action dated Sep. 6, 2018, 7 pages.
European Application No. 14709807.3, Office Action dated May 17, 2018, 6 pages.
European Application No. 14733856.0, Office Action dated Aug. 9, 2018, 8 pages.
Japanese Application No. 2015-552781, Office Action dated Aug. 7, 2018, 4 pages (3 pages for the original document and 1 page for the English translation).
Japanese Application No. 2015-558217, Office Action dated May 29, 2018, 7 pages (4 pages for the original document and 3 pages for the English translation).
Configuring Oracle CQL Processors, Available Online at https://docs.oracle.com/cd/E23943_01/dev.1111/e14301/processorcql. htm#CEPED705, Sep. 9, 2012, pp. 1-14.
U.S. Appl. No. 13/838,259, Notice of Allowance dated Nov. 23, 2018, 12 pages.
U.S. Appl. No. 15/936,037, Non-Final Office Action dated Jun. 6, 2018, 30 pages.
U.S. Appl. No. 15/936,037, Notice of Allowance dated Oct. 5, 2018, 5 pages.
Chinese Application No. 201380056017.2, Office Action dated Nov. 23, 2018, 3 pages.
Chinese Application No. 201380063379.4, Office Action dated Oct. 9, 2018, 7 pages (3 pages for the original document and 4 pages for the English translation).
Chinese Application No. 201480009223.2, Office Action dated Nov. 23, 2018, 8 pages (3 pages for the original document and 5 pages for the English translation).
European Application No. 13776642.4, Office Action dated Oct. 8, 2018, 7 pages.
European Application No. 14709807.3, Summons to Attend Oral Proceedings mailed on Oct. 1, 2018, 8 pages.
Japanese Application No. 2015-534676, Office Action dated Oct. 9, 2018, 4 pages (3 pages for the original document and 1 page for the English translation).
Japanese Application No. 2015-552765, Office Action dated Nov. 6, 2018, 6 pages (3 pages for the original document and 3 pages for the English translation).
Japanese Application No. 2016-516778, Office Action dated Oct. 23, 2018, 9 pages (5 pages for the original document and 4 pages for the English translation).
U.S. Appl. No. 15/700,862, Non-Final Office Action dated Nov. 9, 2018, 15 pages.
U.S. Appl. No. 15/700,862, Non-Final Office Action dated Jun. 10, 2019, 22 pages.
Blumofe et al., An Analysis of Dag-Consistent Distributed Shared-Memory Algorithms, Proceedings of the Eighth Annual ACM Symposium on Parallel Algorithms and Architectures, Jun. 24-26, 1996, 12 pages.
Chinese Application No. 201380063379.4, Office Action dated May 7, 2019, 10 pages (4 pages of Original Document and 6 pages of English Translation).
Chinese Application No. 201580001992.2, Office Action dated Mar. 5, 2019, 21 pages (11 pages of Original Document and 10 pages of English Translation).
Chinese Application No. 201680053838.4, Office Action dated May 29, 2019, 10 pages (4 pages of Original Document and 6 pages of English Translation).
Chinese Application No. 201680053838.4, Office Action dated Jan. 16, 2019, 15 pages (7 pages of Original Document and 8 pages of English Translation).
European Patent Application No. 13815232.7, Office Action dated May 10, 2019, 5 pages.
European Patent Application No. 15708969.9, Office Action dated May 16, 2019, 5 pages.
Japanese Application No. 2016-521684, Office Action dated Jan. 22, 2019, 4 pages (3 pages of Original Document and 3 pages of English Translation).
Masud et al., A Multi-Partition Multi-Chunk Ensemble Technique to Classify Concept-Drifting Data Streams, Advances in Knowledge Discovery and Data Mining: 13th Pacific-Asia Conference, Available online at: https://www.utdallas.edu/~bhavani.thuraisingham/

(56) References Cited

OTHER PUBLICATIONS

Publications/Conference-Papers/DM/C184_A_Multi-partition_Multi-chunk_Ensemble.pdf, pp. 363-375.
Oracle Fusion Middleware Developer's guide for Oracle Event Processing 11g Release 2 (11.1.2.1.0), Oracle Corporation, Feb. 2015, 79 pages.
International Application No. PCT/RU2017/000135, International Search Report and Written Opinion dated Sep. 6, 2017, 11 pages.
International Application No. PCT/RU2017/000136, International Search Report and Written Opinion dated Sep. 6, 2017, 10 pages.
U.S. Appl. No. 15/700,862, Notice of Allowance dated Jan. 30, 2020, 16 pages.
U.S. Appl. No. 15/706,329, Notice of Allowance dated Mar. 11, 2020, 10 pages.
Debbabi et al., Controlling Self-Organising Software Applications with Archetypes, IEEE, Available online at: https://ieeexplore.ieee.org/stamp/stamp.jsp?arnumber=6394112, Sep. 2012, 10 pages.
Herrmannsdoerfer et al., Model-Level Simulation for COLA, IEEE, Available online at: https://dl.acm.org/doi/pdf/10.1109/MISE.2009.5069895?download=true, May 2009, pp. 38-43.
Kodase et al., Transforming Structural Model to Runtime Model of Embedded Software with Real-Time Constraints, IEEE, Available online at: https://ieeexplore.ieee.org/stamp/stamp.jsp?arnumber=1186690, 2003, pp. 6.
Wang et al., Early-Stage Performance Modeling and Its Application for Integrated Embedded Control Software Design, Available online at: https://dl.acm.org/doi/pdf/10.1145/974043.974061?download=true, Jan. 2004, pp. 110-114.
U.S. Appl. No. 15/700,784, Non-Final Office Action dated Apr. 7, 2020, 14 pages.
U.S. Appl. No. 15/700,914, Non-Final Office Action dated Jun. 1, 2020, 9 pages.
U.S. Appl. No. 15/701,019, Non-Final Office Action dated Jun. 15, 2020, 9 pages.
U.S. Appl. No. 15/706,226, Non-Final Office Action dated May 1, 2020, 48 pages.
U.S. Appl. No. 15/706,407, Final Office Action dated Apr. 2, 2020, 9 pages.
U.S. Appl. No. 15/706,407, Notice of Allowance dated Jun. 17, 2020, 8 pages.
U.S. Appl. No. 16/559,913, Non-Final Office Action dated Jun. 15, 2020, 8 pages.
U.S. Appl. No. 16/559,907, Non-Final Office Action dated Jul. 10, 2020, 27 pages.
Brito, et al. Speculative Out-of-Order Event Processing with Software Transaction Memory, Proceedings of the Second International Conference on Distributed Event-Based Systems, Jul. 2008, pp. 265-275.
Chintapalli, et al. Benchmarking Streaming Computation Engines: Storm, Flink and Spark Streaming, IEEE International Parallel and Distributed Processing Symposium Workshops (IPDPSW), May 23, 2016, pp. 1789-1792.
European Application No. 19190843.3, Extended European Search Report dated Nov. 20, 2019, 9 pages.
European Application No. 13815232.7, Summons to Attend Oral Proceedings mailed on Aug. 8, 2019, 6 pages.
European Application No. 16794796.9, Office Action dated Nov. 14, 2019, 6 pages.
U.S. Appl. No. 15/706,329, Non-Final Office Action dated Nov. 13, 2019, 15 pages.
U.S. Appl. No. 15/706,407, Non-Final Office Action dated Nov. 8, 2019, 11 pages.
Salmon, et al. Design Principles of a Stream-Based Framework for Mobility Analysis Geoinformatica, vol. 21, No. 2, Apr. 25, 2016, pp. 237-261.
"Configuration—Spark 2.0.0 Documentation", Anonymous, Available Online at https://web.archive.org/web/20160913085756/https://spark.apache.org/docs/latest/configuration.html#compression-and-serialization, Sep. 13, 2016, 14 pages.
European Patent Application No. EP17771969.7 Office Action dated Jun. 19, 2020, 8 pages.
U.S. Appl. No. 15/700,914, Final Office Action dated Oct. 27, 2020, 9 pages.
U.S. Appl. No. 15/700,784, Final Office Action dated Oct. 27, 2020, 14 pages.
U.S. Appl. No. 16/559,913, Notice of Allowance dated Oct. 27, 2020, 7 pages.

\* cited by examiner

INTEGRATING EVENT PROCESSING WITH MAP-REDUCE

CROSS-REFERENCES TO RELATED APPLICATIONS

The present application claims priority under 35 U.S.C. § 119(e) to U.S. Provisional Application No. 61/733,844, filed Dec. 5, 2012, and titled A METHOD FOR INTEGRATING EVENT PROCESSING WITH MAP REDUCE, the entire contents of which are incorporated herein by reference for all purposes. The present application also claims priority under 35 U.S.C. § 119(e) to U.S. Provisional Application No. 61/806,744, filed Mar. 29, 2013, and titled INTEGRATING EVENT PROCESSING WITH MAP REDUCE, the entire contents of which are incorporated herein by reference for all purposes.

BACKGROUND OF THE INVENTION

A continuous event processor is capable of receiving a continuous stream of events and processing each event contained therein by applying a continuous event processing (CEP) query to that event. Such a CEP query may be formatted in conformance to the syntax of a CEP query language such as the continuous query language (CQL), which is an extension of the structured query language (SQL). Whereas SQL queries are often applied once (per user request) to data that has already been stored in the tables of a relational database, CQL queries are applied repeatedly to events in an incoming event stream as those events are received by the continuous event processor.

For example, a data stream may specify stock prices for various companies. As time passes, the most recent stock prices for those companies may be added to the data stream. The continuous event processor may receive each such stock price and apply a CQL query to that stock price as that stock price arrives. The CQL query may specify various operations, potentially including filtering and aggregation operations. The continuous event processor may then output the results of the application of the CQL query to various interested listeners.

DETAILED DESCRIPTION

Figure 1:
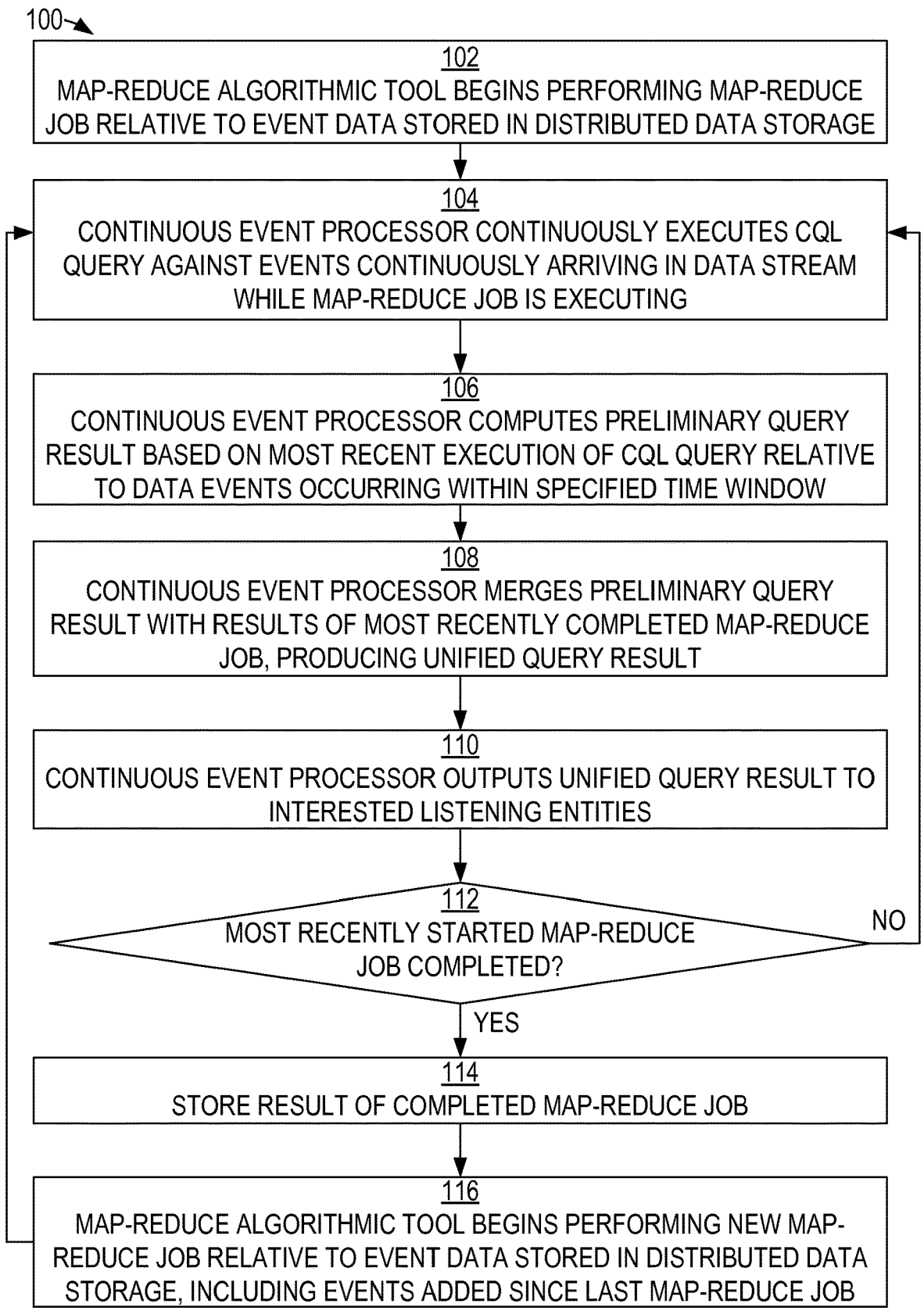
FIG. 1 is a flow diagram that illustrates a technique for calculating a real-time query result relative to a large volume of data using a combination of the Map-Reduce algorithmic tool and CEP, according to an embodiment of the invention.

Embodiments of the invention pertain to the field of continuous event processing. Embodiments of the invention involve a technique for processing or querying large quantities of data relatively quickly using a combination of continuous event processing and the Map-Reduce algorithmic tool. In an embodiment, the continuous event processor continuously produces real-time results by merging (a) CQL query results from events received since a currently executing Map-Reduce job was started with (b) a most recent query result produced by a most recently completed Map-Reduce job. When the currently executing Map-Reduce job completes, its query result is stored and made accessible to the continuous event processor, and a new Map-Reduce job is started relative to event data that has grown in size since the execution of the last Map-Reduce job. The Map-Reduce algorithmic tool provides a convenient mechanism for analyzing and processing large quantities of data. Such large quantities of data are sometime referred to as "Big Data."

Big Data is a term that is used by the information technology media and vendors. Businesses are accumulating huge amounts of data—terabytes, even petabytes of data—and have a competitive desire to get more insight into market trends and corporate performance. Companies are faced with a desire to manage and analyze Big Data. Modern applications deal with very high volumes of data. These high volumes make it difficult to process the data in a speedy manner using conventional processing mechanisms.

As an example of the processing of Big Data, one may consider a case in which a sales manager wants to identify a company's top-selling products in each of the primary markets where the product can be purchased for extended periods, such as the last month. A challenge in accomplishing this task is the volume of data to be processed for such an analysis. The volume of data could vary between thousands, to millions, or even billions of sales transactions. Regular tools such as relational databases and visualization software typically don't scale to such volumes of data. Also, the data can be both structured and unstructured, a trait which might not be handled by data management and analysis tools. Conventional relational database systems are unable to process such large volumes of data in a timely manner.

Thus, some attempts can be made in an effort to manage Big Data. One potential way to deal with large volumes of disparate data would be to partition and replicate the data across different servers to create more manageable data sets. However, creating multiple copies of the data makes it more difficult to maintain the consistency of the information, as updates to one data set may not copy over to the others.

Such a lack of consistency might result, for instance, if an application that uses the data updates an entry in the sales data but then that update fails to be copied to the other replicated sites. The situation can be complicated if other applications that access the data have already used some of that data in other transactions. When the data change, re-partitioning of the data might be appropriate, yet the manner in which such re-partitioning should be performed is often unclear.

One possible approach for dealing with these complexities could involve distributing the data as protected, immutable data. For example, sales transactions could be stored as they occur in some durable storage. Applications could be prevented from changing that stored raw data. Keeping the data immutable avoids the problem of consistency, and the distribution mitigates the problem of volume. However, making the data immutable can make existing data manipulation tools incapable of processing the distributed data in the desired manner.

A particular distributed algorithmic tools can work in conjunction with immutable distributed inputs and can perform, relative to distributed systems, queries similar to the one described in the sales example able. This is particular algorithmic tool is the Map-Reduce algorithmic tool. Various different implementations of the Map-Reduce algorithmic tool exist. For example, one implementation is found in the open-source Apache Hadoop. Using Apache Hadoop, it is possible to create a Map-Reduce job that uses the Big Data sales transactions as input and then returns the top-selling products as the result.

The Map-Reduce algorithmic tool works relative to distributed data. Data can be partitioned into separate nodes, and each node can be maintained as a separate file on a separate computing machine. Each such machine can execute a query in parallel with the other machines relative to the data maintained on that machine. Thus, each machine can produce separate query results pertaining to its particular partition of the data. Next, these separate results can be reduced to a single unified result. The Map-Reduce algorithmic tool can accomplish this reduction. For each entry in the data, the Map-Reduce algorithmic tool can map that entry to a result. For example, if the data entries represent products, then the Map-Reduce algorithmic tool can map each product to a result that indicates that product's sales ranking relative to other products. The Map-Reduce algorithmic tool can then merge all of these results into a single unified result. Such merging is called reduction.

For an example of how the Map-Reduce algorithmic tool can operate relative to data, an example involving the calculation of the quantity of occurrences of a particular word within a multitude of separate web pages can be considered. A first web page might include ten references to the particular word. A second web page might also include ten references to the particular word. A third web page might include only a single reference to the particular word. A fourth web page might include two references to the particular word. The mapping process performed by the Map-Reduce algorithmic tool can map each web page to the quantity of occurrences of the particular word within that web page. In this example, the reduction process performed by the Map-Reduce algorithmic tool merely involves summing together all of the quantities mapped to each web page to produce the final result, which in this example turns out to be 23 occurrences of the particular word.

Due to the distributed nature of the data on which the Map-Reduce algorithmic tool operates, and depending on the size of the input data, the Map-Reduce job might (referring to the sales example discussed above) return the top-selling items in batch results every n minutes, or, more likely, every n hours. Under some circumstances, several minutes or hours is too long to wait for a query result. For instance, some fraud detection applications call for immediate results, as transactions are underway, and not after thousands of fraudulent transactions have already been completed. For another example, a retailer might wish to have up-to-the-minute knowledge of the worst-selling products, so that the store can boost sales of those products by handing out discount cards to customers as those customers enter the store. As the amount of time spend waiting for that knowledge increases, the likely irrelevance of that knowledge is also increases. Typical implementations of the Map-Reduce algorithm do not produce real-time query results.

According to an embodiment of the invention, continuous event processing (CEP) techniques can be used in conjunction with a Map-Reduce algorithmic tool in order to produce more rapidly query results for queries executed against large distributed data sets. Using CEP, a continuous event processor receives events from a data stream in real-time and performs analytical processing relative to those events as they are received. For example, as sales transactions occur within a company's stores, each of those transactions may be added as an event to a data stream at the moments of those transactions. Events placed in the data stream can be listened to by entities, such as application programs, that are interested in receiving those events. Such entities can register with the continuous event processor to receive such events. Additionally, as such sales transactions occur within a company's stores, each of those transactions may be added to a persistent data store such as a relational database, which can be distributed across multiple separate sites according to some partitioning scheme.

The continuous event processor can continuously apply a CEP query to the events from the event stream as those events arrive at the processor. For example, the processor can apply, to events that represent sales transactions, a query which determines the top-selling product over a window of time having a specified duration. In order to do so, the processor can maintain, in computing memory, data pertaining to all events that the processor has received from the data stream within the most recently occurring window of time having that duration. However, this length of this window of time can be limited by the amount of computing memory that is available to the continuous event processor. Typically, the continuous event processor will not have enough memory to extend the window of time to include all sales transactions that have ever occurred, for example, especially if a very high quantity of sales transactions has occurred. The continuous event processor might not even have enough memory to extend the window of time to include all sales transactions that have occurred within the last year, again depending on volume. Additionally, as the size of the window of time increases, the amount of time taken for the continuous event processor to execute a query relative to all of the events falling within that window also increases. CEP mechanisms conventionally are used to compute results pertaining to events occurring within windows of time having relatively limited durations, sometimes on the magnitude of mere hours or minutes.

In order to overcome some of the limitations discussed above, embodiments of the invention merge together the powers of CEP and a Map-Reduce algorithmic tool. The Map-Reduce algorithmic tool can be used to calculate a query result for the most recently accumulated batch of event data. For example, a Map-Reduce job can be scheduled to calculate the results of a query relative to event data that has been stored in a distributed relational database; such data can have been stored in a persistent, non-volatile manner—typically on magnetic media such as hard disk drives. Such a job might take a relatively long amount of time to complete. For example, depending on the quantity of event data that has already accumulated in the distributed data storage, the job might take a day to complete. In an embodiment of the invention, once a Map Map-Reduce job begins to execute at a scheduled time, the Map-Reduce algorithmic tool only considers event data that has been stored in the distributed data storage no later than the scheduled time; the Map-Reduce job does not include events that are currently arriving in the data stream as the Map-Reduce algorithmic tool is processing the job; the Map- Reduce job, according to an embodiment, consists of events that had already been received from the data stream and stored in the distributed data storage as of the time that the Map-Reduce job began to be executed.

Each Map-Reduce job is an example of batch technology. Assuming that a Map-Reduce job takes a specified amount of time to complete, events that have arrived in the data stream and that have been stored in the distributed data storage during that specified amount of time will be considered within a subsequently executed Map-Reduce job—in the next batch. According to an embodiment of the invention, a continuous event processor continuously performs CEP relative to events that arrive in the data stream after (and, in one embodiment, only after) the currently executing Map-Reduce job has started being processed. In such an embodiment, the continuous event processor executes, relative to these newly arrived events, the same or a similar query that the Map-Reduce algorithmic tool is executing relative to the previously stored events in the distributed data storage as part of the scheduled job. The continuous event processor can execute this query relative to the newly arrived events as those events arrive in the data stream—thus, the CEP query can be executed in real-time. In an embodiment of the invention, each time that the continuous event processor produces a query result, the processor merges that query result with the most recent result that the most recently completed Map-Reduce job produced, in order to produce a unified query result. The unified query result reflects query processing that has been performed relative to the event data already stored in the distributed data storage as well as the event data that has arrived more recently than that storage.

FIG. 1 is a flow diagram that illustrates a technique 100 for calculating a real-time query result relative to a large volume of data using a combination of the Map-Reduce algorithmic tool and CEP, according to an embodiment of the invention. Although technique 100 is shown involving certain operations being performed in a certain order, alternative embodiments of the invention can involve the performance of additional, fewer, or different operations, potentially in a different order.

In block 102, a Map-Reduce algorithmic tool (e.g., Apache Hadoop) begins performing a Map-Reduce job relative to event data that is stored in a distributed data storage. In an embodiment, the Map-Reduce job involves the execution of a specified query relative to a specified subset of all of the events that are stored in the distributed data storage. This subset can include the whole set of events that are stored in the distributed data storage, including any that have been stored in the distributed data storage since the beginning of the execution of the previous Map-Reduce job, if any.

In block 104, while the Map-Reduce algorithmic tool is executing the Map-Reduce job relative to the event data that is stored in the distributed data storage, a continuous event processor continuously executes a CQL query against events that are continuously arriving via a data stream. The CQL query can act on all events that have been received within a specified window of time having an ending point at the current time. The CQL query can aggregate the data from such events in its execution. In an embodiment, the CQL query is the same as, or similar to, or performs the same function as, the query that is being executed by the currently executing Map-Reduce job, but relative to separate events. In an embodiment, the CQL query excludes, from its processing, all events that have already been stored in the distributed data storage (which are being processed by the currently executing Map-Reduce job). As is discussed above, in an embodiment, such events are also stored in the distributed data storage, but not considered within the execution of the currently executing Map-Reduce job.

In block 106, the continuous event processor computes a preliminary query result based on the most recent execution of the CQL query relative to data events that are within the specified window of time.

In block 108, the continuous event processor merges the preliminary query result with the result of the most recently completed Map-Reduce job, if any Map-Reduce job has completed. This merger produces a unified query result. In one embodiment of the invention, if no Map-Reduce job has yet completed, then the preliminary query result becomes the unified query result.

In block 110, the continuous event processor outputs the unified query result to interested listening entities. For example, the continuous event processor can output the unified query result to application programs that have registered with the continuous event processor to receive such unified query results.

In block 112, a determination is made as to whether the most recently started Map-Reduce job has completed. If the most recently started Map-Reduce job has completed, then control passes to block 114. Otherwise, control passes back to block 104.

In block 114, the result of the Map-Reduce job is persistently stored. For example, the result of the Map-Reduce job can be stored on a hard disk drive to which the continuous event processor has access. As is discussed above in connection with block 108, the continuous event processor can merge this result with the processor's own preliminary result to produce the unified query result. In an embodiment, the result of the Map-Reduce job overwrites and replaces a previously stored result of a previously executed Map-Reduce job.

In block 116, the Map-Reduce algorithmic tool (e.g., Apache Hadoop) begins performing a new Map-Reduce job relative to the event data that is stored in the distributed data storage. In an embodiment, the Map-Reduce job involves the execution of the specified query relative to a specified subset of all of the events that are stored in the distributed data storage. In an embodiment, this subset includes events that have been stored in the distributed data storage since the beginning of the execution of the previous Map-Reduce job. Control passes back to block 104.

For example, if a result of a most recently completed Map-Reduce job indicate that the quantity of a particular word in a set of web pages is 23, and if a new web page arrives as an event in a data stream, and if the continuous event processor determines that the quantity of the particular word in that new web page is 5, then the continuous event processor can merge this result from the most recently completed Map-Reduce job's result to produce a unified query result of 28. The new web page can be added to the distributed data storage so that a subsequent (not current) Map-Reduce job can operate on event data that includes the new web page.

Figure 2:
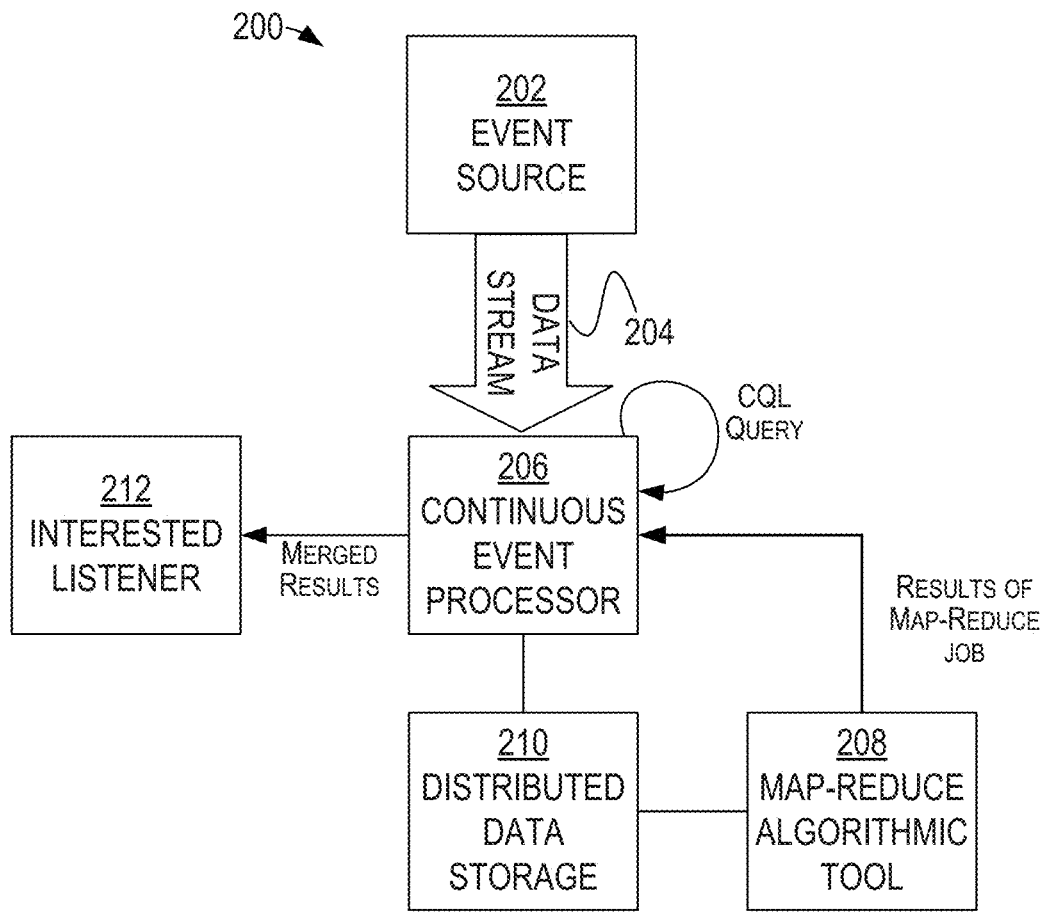
FIG. 2 is a block diagram that illustrates a system for calculating a real-time query result relative to a large volume of data using a combination of the Map-Reduce algorithmic tool and CEP, according to an embodiment of the invention.

FIG. 2 is a block diagram that illustrates a system 200 for calculating a real-time query result relative to a large volume of data using a combination of the Map-Reduce algorithmic tool and CEP, according to an embodiment of the invention. In an embodiment, system 200 includes an event source 202, a data stream 204 including events, a continuous event processor 206, a Map-Reduce algorithmic tool 208, a distributed data storage 210, and a listening entity 212. In an embodiment, event source 202 can continuously add events (e.g., sales transactions, stock prices, etc.) to data stream 204 as those events occur. Continuous event processor 206 can continuously read events from data stream 204 and can continuously execute a CQL query relative to those events. Continuous event processor 206 also can continuously store the events that it reads into distributed data storage 210. Continuous event processor 206 also can continuously merge results of the execution of the CQL query with a most recent result of a completed Map-Reduce job executed by Map-Reduce algorithmic tool 208. Map-Reduce algorithmic tool 208 can execute one Map-Reduce job after another. Each such Map-Reduce job can execute a query that is the same as, or similar to, the CQL query relative to the events that have been stored in distributed data storage 210 as of the time of the beginning of the execution of that Map-Reduce job. Each such Map-Reduce job can persistently store the results of its query execution, when it completes, on a medium (potentially distributed data storage 210) that is accessible to continuous event processor 206 for merging purposes. Listening entity 212 can continuously receive unified query results output by continuous event processor 206 and use those, potentially displaying such results to human users.

In one embodiment, the CQL query and corresponding Map-Reduce (e.g., Hadoop) job can be separately and manually created and executed by a user. However, in an alternative embodiment, the creation and execution of the CQL query and corresponding Map-Reduce job can be integrated, such that the Map-Reduce job (or program) can be automatically generated based on an existing corresponding CQL query. For example, in an embodiment, a user can utilize a CEP system in order to create a CQL query that determines top-selling products based on sales transaction events represented in a data stream. A Map-Reduce program can then be automatically generated by a Map-Reduce program generator using the CQL query as input. A program (either the same program or a separate program) can also be generated automatically to merge continuously the results returned by each executed Map-Reduce job with the results returned by the execution of the CQL query.

Map-Reduce jobs can be represented in a particular language called Pig Latin. Pig Latin is a high-level descriptive language. For example, in Pig Latin, a job or program could be expressed which loads data, filters that data, joins that data with other data, etc. Pig Latin programs can be expressed in terms of operators. These operators may perform operations such as load data, filter data, join data, etc. In an embodiment of the invention, a Pig Latin program generator receives a CQL query as input and automatically breaks that query up into its component operators. Such CQL operators may include filter operators, join operators, projection operators, etc. In an embodiment of the invention, the Pig Latin program generator utilizes mappings between CQL operators and Pig Latin operators in order to translate from one set of operators to the other automatically; such mappings can include one-to-one operator-to-operator mappings as well as one-to-many operator-to-operators mappings as well as many-to-one operators-to-operator mappings as well as many-to-many operators-to-operators mappings.

In an embodiment, after a set of Pig Latin operators has been automatically generated based on the corresponding CQL operators, the Pig Latin program generator automatically generates and stores a flow that can include both CQL operators and Pig Latin operators. This flow can indicate that the output of a CQL operator is to be the input to a Pig Latin operator, and/or that the output of a Pig Latin operator is to be the input to a CQL operator. Thus, a directed graph of operators can be generated, including both Pig Latin and CQL operators. In this directed graph, the edges between operator nodes can indicate the flow of data from operator to operator. Potentially, one operator can output data to multiple operators, and multiple operators can output data to a single operator. Leaf node operators in the graph can perform the final merging between CQL operation results and Map-Reduce operation results. After the directed graph has been generated automatically in this manner, some optimization of the graph can be performed automatically, potentially involving the merger of some operator nodes in the graph based on the types of operators that those operators perform. For example, a CQL operator and a Pig Latin operator that both perform a filtering operation can be merged together into a single operator.

At execution time, the directed graph can be interpreted. When a Pig Latin operator, or a set of Pig Latin operators linked by one or more edges, is encountered in the graph, a corresponding Map-Reduce program, which performs those operators' operations, can be executed automatically. Results of the Map-Reduce program can be sent as input events to CQL queries corresponding to CQL operators in the directed graph.

Joining Results of Continuous and Batch Processing Using a Single Language

As is discussed above, in one embodiment, a continuous query processor can continuously process a CQL query against events currently arriving in an event stream while a Map-Reduce program concurrently processes events that were previously received from the stream and stored. The results of the processing performed by the continuous query processor can be merged periodically with the results of the processing performed by the Map-Reduce program in order to generate a relatively fresh result for a large data set.

According to an embodiment, the continuous query processor executes queries that are composed in a single high-level language such as CQL. As a result of the compilation of such queries, two aspects can be generated at run time. One aspect performs event stream processing. During the same compilation, as the other aspect, additional operators can be generated. These additional operators can be integrated into Hadoop or some other Map-Reduce tool. The Map-Reduce tool can perform batch-oriented processing. The results of the stream processing can be merged with the results of the batch processing. Consequently, large amounts of data can be manipulated while also permitting results to be obtained in real-time.

Event processing applications, such as Oracle Event Processing (OEP), are designed to process events in real-time. However, such applications traditionally have been designed to process events that are relatively short-lived. Such processing traditionally has not been very deep. Event processing applications traditionally have processed events that are occurring as the processing occurs. Those event processing applications traditionally have not inspected data that might have been stored in a database years earlier.

Map-Reduce tools, such as Hadoop, can operate on large amounts of data that have been stored in a repository such as a database, which can be physically contained on a hard disk drive. The data stored in such a database can be relatively old—even years old. The data stored in such a database might have been generated and stored years previously. Because it might have been accumulating for such a long time, the quantity of the data stored in such a database can be relatively large. A Map-Reduce tool can process a large data set stored in a database in a distributed manner.

The Map-Reduce tool can create a map task and a reduce task. These tasks can be executed in a distributed manner. The processing of the large data set can be broken up into separate aspects, and the processing for each aspect can be distributed among separate processing elements. The Map-Reduce tool can perform its processing in a batch-oriented manner, such that the batch job it performs relative to the large data set has both a beginning and a completion.

The Map-Reduce tool can perform its processing in a way that is isolated from the processing being concurrently performed by the continuous event processor. Although the Map-Reduce tool performs its processing in a batch-oriented manner, with a definitive task beginning and end, the continuous event processor performs its processing continuously, without end. Events in the event stream arrive at the continuous event processor continuously. Embodiments of the invention can join together the results of the continuous event processor's continuous-type processing and the results of the Map-Reduce tool's batch-type processing. Moreover, embodiments of the invention can accomplish this joining using a single high-level language such as CQL.

An alternative approach could involve one application that performs stream processing and another, separate application that performs batch processing. A third custom application could be written to try to put the results of the different types of processing together. Such an approach might involve the use of three different programming languages—one for the stream processing, one for the batch processing, and one for the joining of the results of each type of processing.

In order to avoid the use of multiple different languages, one embodiment of the invention involves the compilation of a high-level CQL query into a functionally equivalent Map-Reduce program. The results of the execution of the CQL query are then merged with the results of the Map-Reduce program. The CQL query can produce results in real-time, while the Map-Reduce program can perform deeper analysis on larger data sets. The results of the merger therefore are both real-time and deep. Such a merger can be achieved based on a single user-specified query that is compiled to generate both the real-time and deep-analysis components of the system. Separate applications in different languages do not need to be built.

Figure 5:
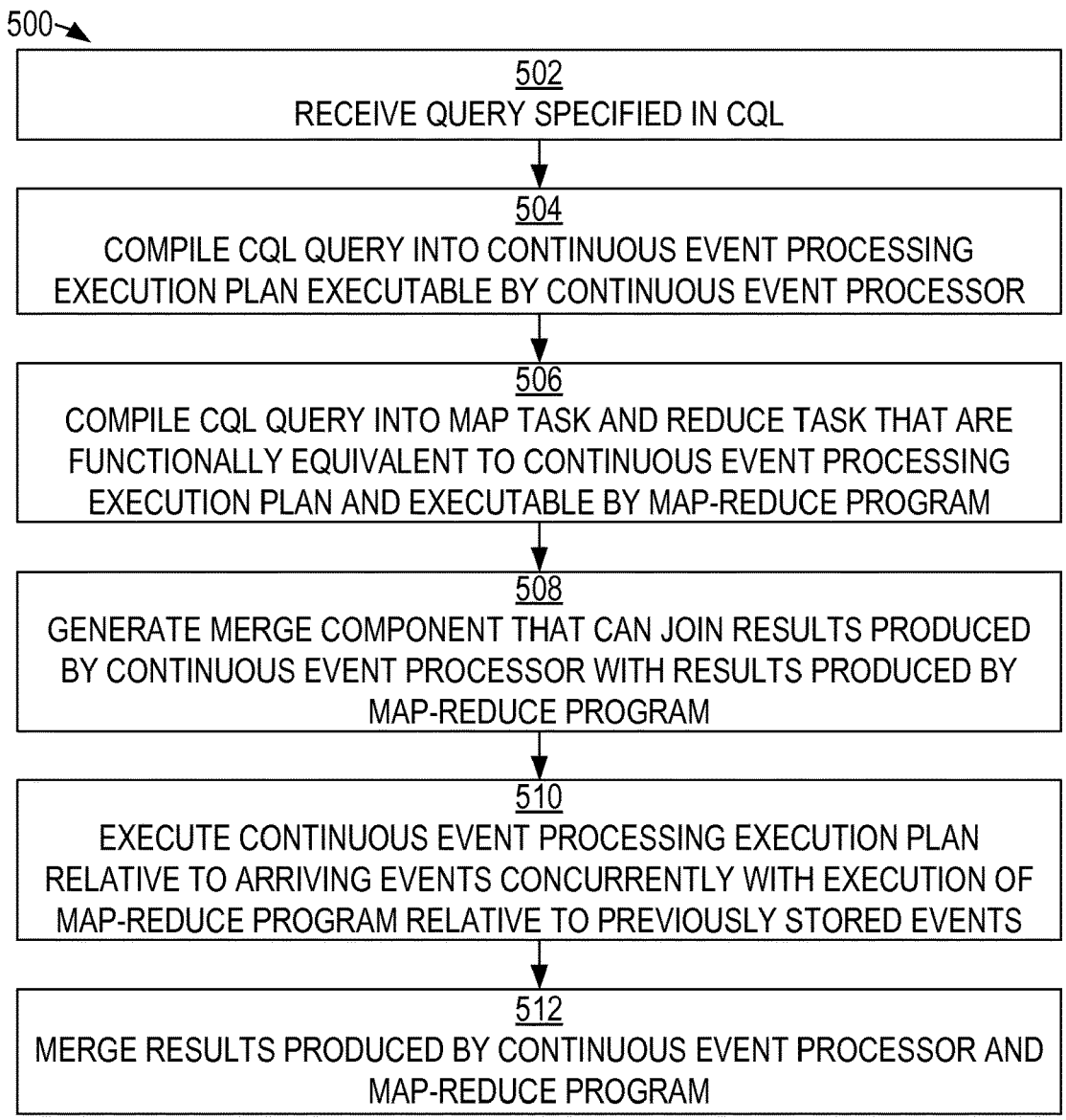
FIG. 5 is a flow diagram that illustrates an example of a technique for generating continuous and batch processing components based on a single query, according to an embodiment of the invention.

FIG. 5 is a flow diagram that illustrates an example of a technique 500 for generating continuous and batch processing components based on a single query, according to an embodiment of the invention. In block 502, a query specified in CQL is received. In block 504, a compiler compiles the CQL query into a continuous event processing execution plan that can be executed by a continuous event processor. In block 506, the compiler compiles the CQL query into a map task and a reduce task that are functionally equivalent to the continuous event processing execution plan and that can be executed as a batch job in a distributed manner by a Map-Reduce program. In block 508, the compiler generates a merge component that can join the results produced by the continuous event processor with the results produced by the Map-Reduce program. In block 510, the continuous event processor executes the plan relative to currently arriving events from an event stream while the Map-Reduce program executes the map and reduce tasks relative to data previously stored in a database. In block 512, the merge component joins the results produced by the continuous event processor and the Map-Reduce program. Control passes back to block 510.

Generating Corresponding Real-Time and Batch Operators

In an example scenario, a user might want to count a quantity of references to a particular word within a set of texts. A Map-Reduce tool, such as Hadoop, can process each file in a set of files in order to count the quantity of references to the particular word. The set of files processed by the Map-Reduce tool might contain short texts that were stored from an event stream years ago. For example, the set of file might contain short texts received from the stream over a span of ten years, except for the relatively recent past (e.g., the most recent minute). While this is occurring, a continuous event processor can receive similar short real-time texts from on-line applications such as Facebook or Twitter. The continuous event processor can count the quantity of references to the particular word within these real-time texts shortly after those real-time texts are generated (e.g., immediately after the user posts such texts using Facebook or Twitter). The count calculated by the Map-Reduce tool can be joined with the count calculated by the continuous event processor.

In order to specify the word-counting task to be performed, a user can use CQL to specify a query. Syntactically, CQL resembles Structured Query Language (SQL). The query might roughly take a form such as: FROM location GROUP BY word SELECT count. Such a query can gather all of the sentences from the specified location, group the unique words from those sentences into distinct groups, and then count the quantity of words in each group. Thus, the query can be specified using a relatively simple format.

A compiler receiving the user-specified CQL query can break the query into separate operators. These can include, for example, a group-by operator, an aggregation operator to perform the counting, an output operator that also acts as a source operator, etc. Based on this set of operators, the compiler can generate both (a) a query execution plan for real-time event processing and (b) a batch job for processing of a large data set. Referring to the specific example word-counting scenario above, the generation of the batch job can involve the generation of a map operator that maps various sentences into separate unique words. The generation of the batch job can further involve the generation of a reduce operator that reduces each set of unique words into a corresponding number that represents the quantity of those words. As a part of generating the query execution plan, the compiler can generate a merge operator that merges the results of the batch reduce operator with the results of the continuous aggregation operator. The batch job can then be executed concurrently with the real-time continuous query. The merge operator obtains a batch view from the Map-Reduce component and a real-time view from the continuous event processor.

Figure 6:
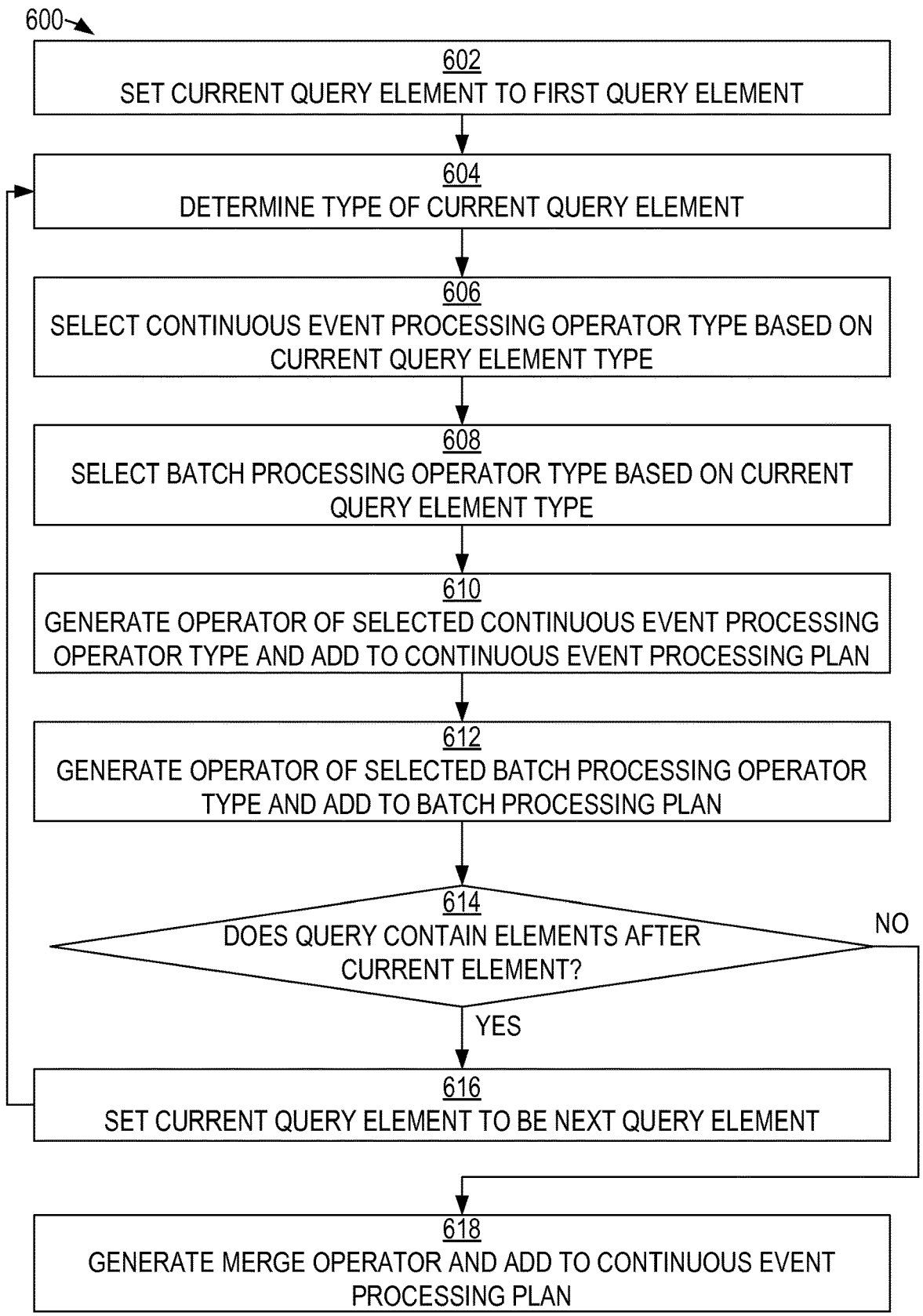
FIG. 6 is a flow diagram that illustrates an example of a technique for generating functionally equivalent operators based on a query, according to an embodiment of the invention.

FIG. 6 is a flow diagram that illustrates an example of a technique 600 for generating functionally equivalent operators based on a query, according to an embodiment of the invention. In block 602, the current element of the query is set to be the first element of the query. In block 604, a type of the current element (e.g., group-by, aggregate, select, etc.) is determined. In block 606, a continuous event processing operator type is selected based on the type of the current element. In block 608, a batch processing operator type (e.g., map, reduce, etc.) is selected based on the type of the current element. In block 610, an operator of the selected continuous event processing operator type is generated and added to the continuous event processing plan. In block 612, an operator of the selected batch processing operator type is generated and added to the batch processing plan. In block 614, a determination is made whether the query contains any elements after the current element. If so, then control passes to block 616. Otherwise, control passes to block 618.

In block 616, the current element of the query is set to the be next element of the query. Control passes back to block 604.

Alternatively, in block 618, a merge operator is generated and added to the continuous event processing plan. The technique illustrated in FIG. 6 then concludes.

Stateless and Stateful Operators

Generally, there are two different sets of operators in CQL. One such set of operators is stateless. With such stateless operators, one input is typically mapped to one or more outputs in a graph of interconnected operators. According to an embodiment of the invention, stateless CQL operators correspond to map operators in the batch processing domain. Another set of CQL operators is stateful. With such stateless operators, multiple inputs are typically mapped to one output in a graph of interconnected operators. According to an embodiment of the invention, stateful CQL operators correspond to reduce operators in the batch processing domain.

Thus, in one embodiment of the invention, the compiler determines whether a CQL query element maps one input into one or more outputs. If so, then the compiler determines that the element corresponds to a stateless event processing operator. A filter operator is an example of a stateless event processing operator. In response to determining that the event processing operator is a stateless operator, the compiler generates a functionally equivalent map operator for inclusion in the batch processing job (in the Map-Reduce language of choice). Alternatively, the compiler can determine whether a CQL query element maps multiple inputs into a single output. If so, then the compiler determines that the element corresponds to a stateful event processing operator. A window operator is an example of a stateful event processing operator. In response to determining that the event processing operator is a stateful operator, the compiler generates a functionally equivalent reduce operator for inclusion in the batch processing job (in the Map-Reduce language of choice).

An element of a CQL query may perform an aggregation function of a particular type (e.g., sum, average, count, etc.). In one embodiment of the invention, the compiler determines the specific aggregation type of a CQL query aggregation operator and responsively generates a reduce operator that performs the same type of aggregation function. Thus, for example, if the continuous event operator performs a sum operation, then the compiler responsively generates a reduce operator that performs a sum operation, but if the continuous event operator performs a count operation, then the compiler responsively generates an aggregation operator that performs a count operation.

Avoiding Duplicative Event Processing in Merged Results

According to an embodiment of the invention, the merge operator is designed in a manner such that no overlap is produced between the real-time continuous processing results and the non-real-time batch processing results. The merge operator can contain a safeguard that prevents any item of data from being merged with itself due to processing by both the real-time and non-real-time aspects. As a result, no single event will be considered more than once during any particular iteration of joined results. In one embodiment of the invention, during any particular iteration, the merge operator only accepts results from the non-real-time (e.g., Map-Reduce) component that are older than a specified time point (e.g., one minute ago) and only accepts results from the real-time (e.g., continuous event processor) component that are no older than that specified time point. Inasmuch as the processing can be performed repeatedly, the time point can advance with each iteration.

For example, in a first iteration, the merge operator can define bounds of the large data set to include only events that have occurred up until 12:50:45 on the current date. The merge operator can, in that first iteration, define bounds of the data set handled by the continuous event processor to include only events that have occurred more recently than 12:50:45 on the current date. Assuming that a time window for the continuous event processor is ten seconds, for the second iteration, this boundary can advance ten seconds from 12:50:45 to 12:50:55. The events that were received during the first iteration, in the ten-second interval spanning 12:50:45 to 12:50:55, have been added to the large data set as they arrived, and have been time-stamped to indicate their arrival time from the event stream. At the end of each iteration, the boundary can be advanced by the amount of time that is needed for one unit of real-time event processing. This amount may be based on the size of the memory that is available to the continuous event processor. In one embodiment of the invention, this amount of time is not static, but can vary from iteration to iteration, such that the boundary can advance by different amounts after different iterations. In such an embodiment, the boundary of each iteration may be based on a specified quantity of events to be processed by the continuous event processor rather than a fixed temporal duration.

As a result, during any particular iteration, the merge operator ensures that no the set of events that are processed by the continuous event processor during that particular iteration cannot include any events that are also processed by the batch processor during that same particular iteration, although such events can later be included within the set of events that will be processed by the batch processor during subsequent iterations. Essentially, the merge operator can calculate the union of the sets of results produced by the continuous event processor and the batch processor with the exception that timestamps of events in the unified set are not allowed to overlap.

It should be noted that the merge operator may under some circumstances do more than just concatenate or sum the real-time and batch results. For example, if an average operator is involved in the processing, then the merge operator may perform a more complicated merger. For a more specific example, if the continuous event processor determined that the average of four numbers was 4, and if the batch processor determines that the average of eight numbers was 10, then the merge operator would determine that the average of all twelve numbers was (4*4+8*10)/12=8. The kind of merging performed may depend on the type of aggregation operation that was being performed in the query.

Compiling CQL Queries into Pig Latin Programs

Pig Latin is a language that can be used by Map-Reduce. In one embodiment of the invention, the compilation of a CQL query can involve the generation of analogous operators in Pig Latin. Based on these analogous operators, a functionally equivalent Pig Latin program can be automatically generated by the compiler concurrently with the compilation of the CQL query for use by the continuous query processor. The Map-Reduce tool can execute the Pig Latin program concurrently with the continuous query processor's execution of the CQL query.

However, in an alternative embodiment of the invention, Pig Latin operators are not generated. Instead, native operators usable by the Map-Reduce tool can be generated.

Embodiments of the invention are not limited to embodiments in which Pig Latin programs are generated.

Hardware Overview

Figure 3:
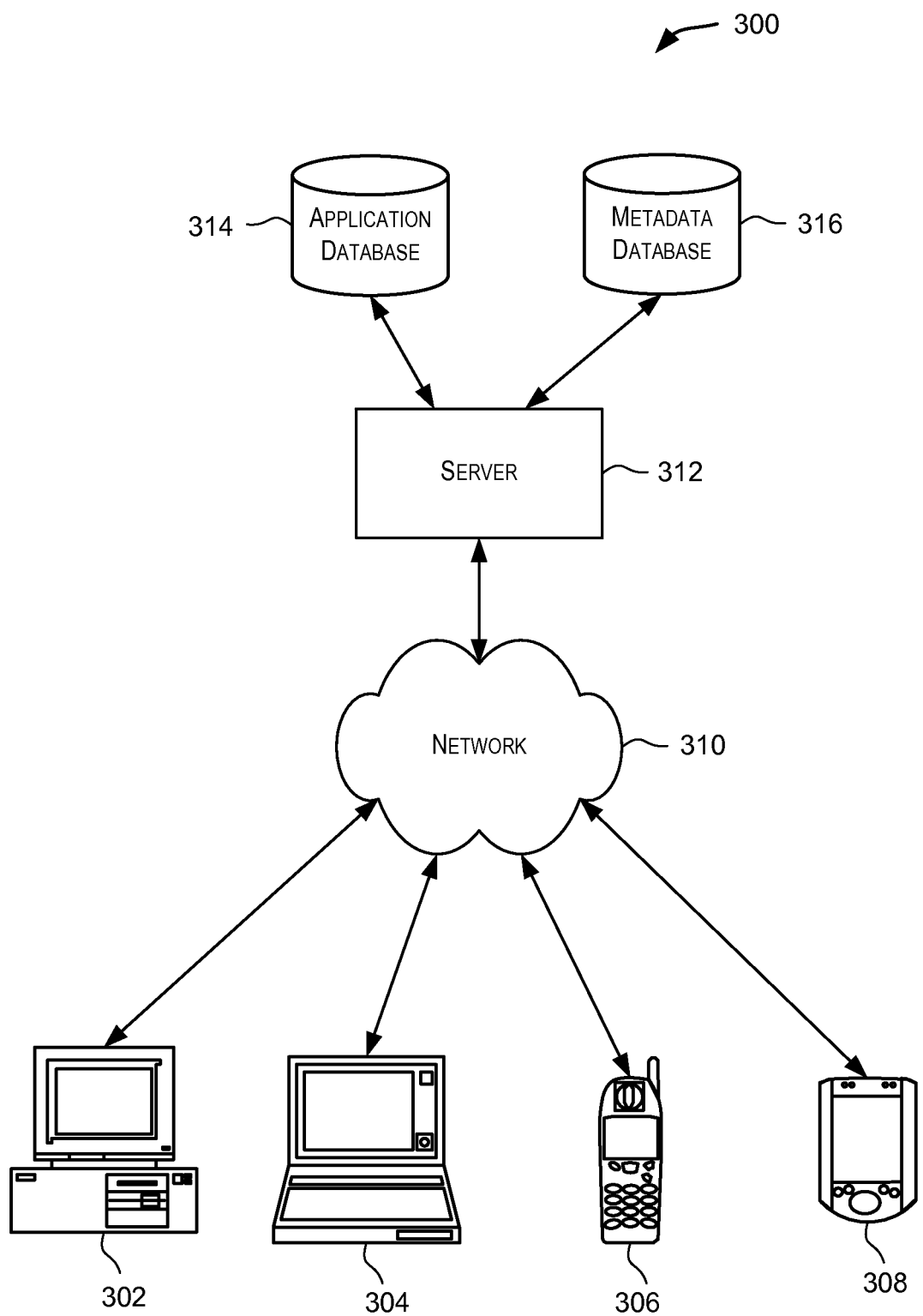
FIG. 3 is a simplified block diagram illustrating components of a system environment that may be used in accordance with an embodiment of the present invention.

FIG. 3 is a simplified block diagram illustrating components of a system environment 300 that may be used in accordance with an embodiment of the present invention. As shown, system environment 300 includes one or more client computing devices 302, 304, 306, 308, which are configured to operate a client application such as a web browser, proprietary client (e.g., Oracle Forms), or the like. In various embodiments, client computing devices 302, 304, 306, and 308 may interact with a server 312.

Client computing devices 302, 304, 306, 308 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 302, 304, 306, and 308 may be any other electronic device, such as a thin-client computer, Internet-enabled gaming system, and/or personal messaging device, capable of communicating over a network (e.g., network 310 described below). Although exemplary system environment 300 is shown with four client computing devices, any number of client computing devices may be supported. Other devices such as devices with sensors, etc. may interact with server 312.

System environment 300 may include a network 310. Network 310 may be any type of network familiar to those skilled in the art that can support data communications using any of a variety of commercially-available protocols, including without limitation TCP/IP, SNA, IPX, AppleTalk, and the like. Merely by way of example, network 310 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 300 also includes one or more server computers 312 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 312 may be adapted to run one or more services or software applications described in the foregoing disclosure. For example, server 312 may correspond to continuous event processor 206 or Map-Reduce algorithmic tool 208 of FIG. 2.

Server 312 may run an operating system including any of those discussed above, as well as any commercially available server operating system. Server 312 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 300 may also include one or more databases 314, 316. Databases 314, 316 may reside in a variety of locations. By way of example, one or more of databases 314, 316 may reside on a storage medium local to (and/or resident in) server 312. Alternatively, databases 314, 316 may be remote from server 312, and in communication with server 312 via a network-based or dedicated connection. In one set of embodiments, databases 314, 316 may reside in a storage-area network (SAN) familiar to those skilled in the art. Similarly, any necessary files for performing the functions attributed to server 312 may be stored locally on server 312 and/or remotely, as appropriate. In one set of embodiments, databases 314, 316 may include relational databases, such as Oracle 10g, which are adapted to store, update, and retrieve data in response to SQL-formatted commands.

Figure 4:
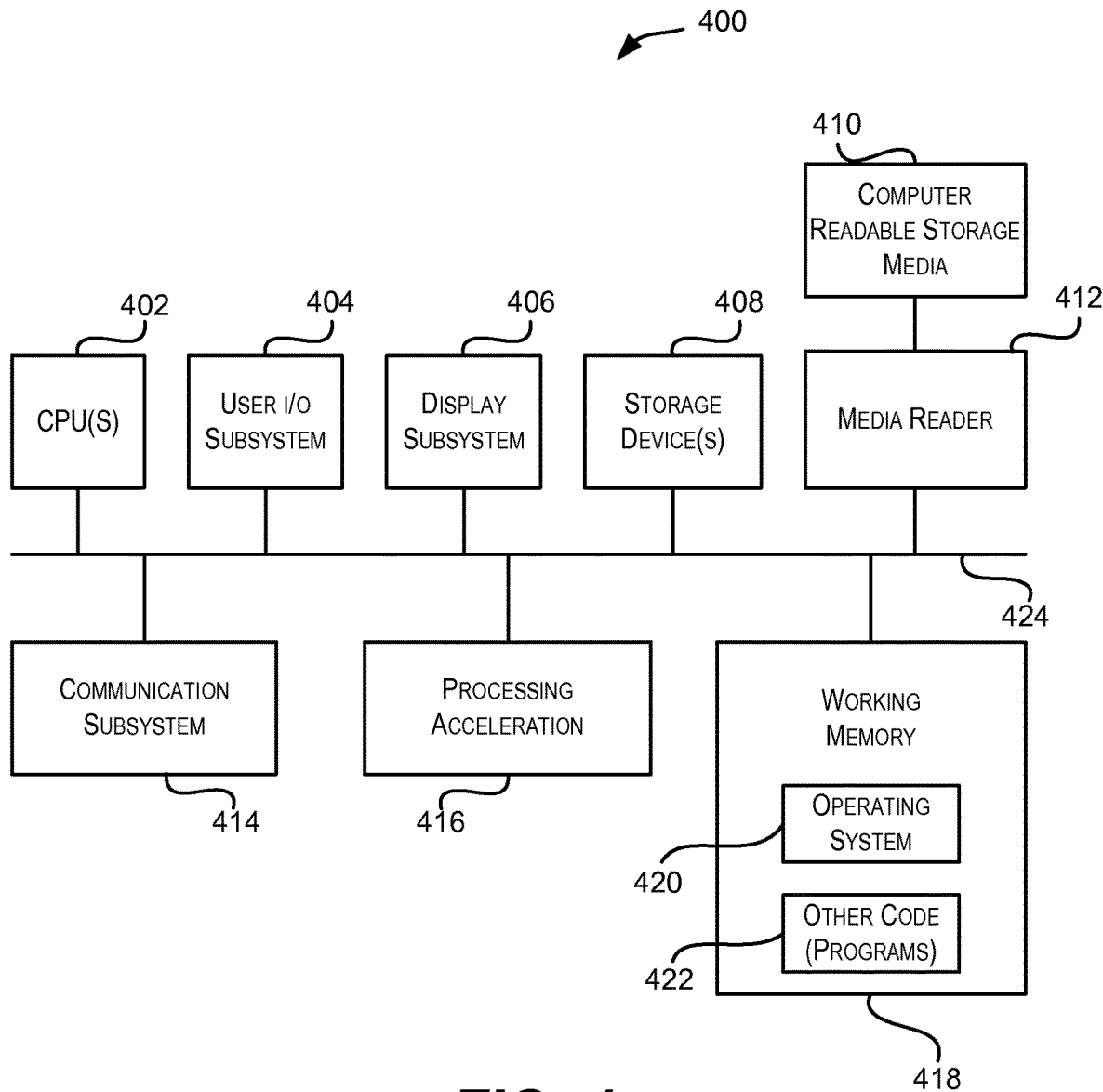
FIG. 4 is a simplified block diagram of a computer system that may be used in accordance with embodiments of the present invention.

FIG. 4 is a simplified block diagram of a computer system 400 that may be used in accordance with embodiments of the present invention. For example, continuous event processor 206 or Map-Reduce algorithmic tool 208 of FIG. 2 may be implemented using a system such as system 400. Computer system 400 is shown comprising hardware elements that may be electrically coupled via a bus 424. The hardware elements may include one or more central processing units (CPUs) 402, one or more input devices 404 (e.g., a mouse, a keyboard, etc.), and one or more output devices 406 (e.g., a display device, a printer, etc.). Computer system 400 may also include one or more storage devices 408. By way of example, the storage device(s) 408 may include devices such as disk drives, optical storage devices, and solid-state storage devices such as a random access memory (RAM) and/or a read-only memory (ROM), which can be programmable, flash-updateable and/or the like.

Computer system 400 may additionally include a computer-readable storage media reader 412, a communications subsystem 414 (e.g., a modem, a network card (wireless or wired), an infra-red communication device, etc.), and working memory 418, which may include RAM and ROM devices as described above. In some embodiments, computer system 400 may also include a processing acceleration unit 416, which can include a digital signal processor (DSP), a special-purpose processor, and/or the like.

Computer-readable storage media reader 412 can further be connected to a computer-readable storage medium 410, together (and, optionally, in combination with storage device(s) 408) comprehensively representing remote, local, fixed, and/or removable storage devices plus storage media for temporarily and/or more permanently containing computer-readable information. Communications system 414 may permit data to be exchanged with a network and/or any other computer described above.

Computer system 400 may also comprise software elements, shown as being currently located within working memory 418, including an operating system 420 and/or other code 422, such as an application program (which may be a client application, Web browser, mid-tier application, RDBMS, etc.). In an exemplary embodiment, working memory 418 may include executable code and associated data structures (such as caches) used for the techniques described above. It should be appreciated that alternative embodiments of computer system 400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-implemented method comprising:
   receiving, at a computer system, a query from a user in a high-level query language;
   generating, with a compiler of the computer system in response to receiving the query, (1) a query execution plan for real-time event processing that can be executed by a continuous event processor of the computer system to perform the query on events received via a data stream, (2) a batch job comprising operators for performing the query on a persistent data store, and (3) a merge component for merging results output from the batch job and the query execution plan;
   executing, by a batch processor of the computer system, the batch job at a first time relative to a first set of events stored in the persistent data store at the first time to generate a first result, wherein the batch job completes at a second time following the first time and the first result is generated when the batch job completes;
   storing, by the computer system in response to the batch job completing at the second time, the first result in a location accessible to the continuous event processor;
   executing, by the batch processor of the computer system, the batch job at the second time relative to a second set of events stored in the persistent data store at the second time to generate a second result, wherein the second set of events comprises the first set of events, and wherein the batch job completes at a third time following the second time;
   receiving, at the computer system between the second time and the third time, a third set of events via the data stream;
   in response to receiving each of the events in the third set of events:
      continuously executing, with the continuous event processor, the query execution plan relative to the received events in the third set of events to generate a third result;
      merging, with the merge component executed by the continuous event processor, the first result stored in the location and the third result to generate a unified result; and
      outputting, with the continuous event processor, the unified result to one or more listening devices; and
   replacing, by the computer system in response to the batch job completing at the third time, the first result with the second result in the location accessible to the continuous event processor.

2. The computer-implemented method of claim 1, wherein the query execution plan is functionally equivalent to and syntactically different from the batch job.

3. The computer-implemented method of claim 1, wherein the query is continuous query language (CQL) query and the batch job is a Map-Reduce program.

4. The computer-implemented method of claim 1, wherein the generating the query execution plan, the batch job, and the merge component comprises:
   parsing, with the compiler, the query;
   based on the parsing, separating, with the compiler, the query into a set of continuous query language (CQL) operators;
   generating, with the compiler based on specified mappings between CQL operators and Pig Latin operators, a set of Pig Latin operators that perform functionally equivalent operations as operations performed by the set of CQL operators;
   generating, with the compiler based on the set of Pig Latin operators, the batch job; and
   generating, with the compiler, a merge operator to unite results of the query execution plan and the batch job to generate the merge component.

5. The computer-implemented method of claim 1, wherein the generating the query execution plan, the batch job, and the merge component comprises:
   parsing, with the compiler, the query;
   based on the parsing, separating, with the compiler, the query into a set of continuous query language LCQL) operators;
   generating, with the compiler based on specified mappings between CQL operators and Pig Latin operators, a set of Pig Latin operators that perform functionally equivalent operations as operations performed by the set of CQL operators; and
   generating, with the compiler, a directed graph of nodes including operators from the set of CQL operators, operators from the set of Pig Latin operators, edges from nodes representing operators from the set of CQL operators to nodes representing operators from the set of Pig Latin operators, and edges from nodes representing operators form the set of Pig Latin operators to operators from the set of CQL operators.

6. The computer-implemented method of claim 1, wherein the generating the query execution plan, the batch job, and the merge component comprises:
parsing, with the compiler, the query;
based on the parsing, separating, with the compiler, the query into a set of continuous query language (CQL) operators;
generating, with the compiler based on specified mappings between CQL operators and Pig Latin operators, a set of Pig Latin operators that perform functionally equivalent operations as operations performed by the first set of CQL operators;
generating, with the compiler, a directed graph of nodes including operators from the first set of CQL operators and operators from the set of Pig Latin operators; and
merging, with the compiler, two or more nodes in the directed graph based on similarities between operations performed by the two or more nodes.

7. The computer-implemented method of claim 1, wherein an event in the first set of events or an event in the second set of events comprises data having timestamp information.

8. A computer-readable memory storing particular instructions to cause one or more processors to perform operators, the particular instructions comprising:
instructions to cause the one or more processors to receive a query from a user in a high-level query language;
instructions to cause the one or more processors to generate, in response to receiving the query, (1) a query execution plan for real-time event processing that can be executed by a continuous event processor to perform the query on events received via a data stream, (2) a batch job comprising operators for performing the query on a persistent data store, and (3) a merge component for merging results output from the batch job and the query execution plan;
instructions to cause a batch processor of the one or more processors to execute the batch job at a first time relative to a first set of events stored in the persistent data store at the first time to generate a first result, wherein the batch job completes at a second time following the first time and the first result is generated when the batch job completes;
instructions to cause the one or more processors to store, in response to the batch job completing at the second time, the first result in a location accessible to the continuous event processor;
instructions to cause the batch processor of the one or more processors to execute the batch job at the second time relative to a second set of events stored in the persistent data store at the second time to generate a second result, wherein the second set of events comprises the first set of events, and wherein the batch job completes at a third time following the second time;
instructions to cause the one or more processors to receive, between the second time and the third time, a third set of events via the data stream;
instructions to cause a continuous event processor of the one or more processors to, in response to receiving each of the events in the third set of events:
continuously execute the query execution plan relative to the received events in the third set of events to generate a third result;
merge, with the merge component, the first result stored in the location and the third result to generate a unified result; and
output the unified result to one or more listening devices; and
instructions to cause the one or more processors to replace, in response to the batch job completing at the third time, the first result with the second result in the location accessible to the continuous event processor.

9. The computer-readable memory of claim 8, wherein the query execution plan is functionally equivalent to and syntactically different from the batch job.

10. The computer-readable memory of claim 8, wherein the query is a continuous query language (CQL) query and the batch job is a Map-Reduce program.

11. The computer-readable memory of claim 8, wherein the particular instructions to generate the query execution plan, the batch job, and the merge component comprise:
instructions to cause the one or more processors to parse the query;
instructions to cause the one or more processors to separate, based on the parsing, the query into a set of continuous query language (CQL) operators;
instructions to cause the one or more processors to generate, based on specified mappings between CQL operators and Pig Latin operators, a set of Pig Latin operators that perform functionally equivalent operations as operations performed by the set of CQL operators;
instructions to cause the one or more processors to generate, based on the set of Pig Latin operators, the batch job; and
instructions to cause the one or more processors to generate a merge operator to unite results of the query execution plan and the batch job to generate the merge component.

12. The computer-readable memory of claim 8, wherein the particular instructions to generate the query execution plan, the batch job, and the merge component comprise:
instructions to cause the one or more processors to parse the query;
instructions to cause the one or more processors to separate, based on the parsing, the query into a set of continuous query language (CQL) operators;
instructions to cause the one or more processors to generate, based on specified mappings between CQL operators and Pig Latin operators, a set of Pig Latin operators that perform functionally equivalent operations as operations performed by the set of CQL operators; and
instructions to cause the one or more processors to generate a directed graph of nodes including operators from the set of CQL operators, operators from the set of Pig Latin operators, edges from nodes representing operators from the first set of CQL operators to nodes representing operators from the set of Pig Latin operators, and edges from nodes representing operators form the set of Pig Latin operators to operators from the set of CQL operators.

13. The computer-readable memory of claim 8, wherein the particular instructions to generate the query execution plan, the batch job, and the merge component comprise:
instructions to cause the one or more processors to parse the query;
instructions to cause the one or more processors to separate, based on the parsing, the query into a set of continuous query language (CQL) operators;
instructions to cause the one or more processors to generate, based on specified mappings between CQL operators and Pig Latin operators, a set of Pig Latin operators that perform functionally equivalent operations as operations performed by the set of CQL operators;

instructions to cause the one or more processors to generate a directed graph of nodes including operators from the set of CQL operators and operators from the set of Pig Latin operators; and instructions to cause the one or more processors to merge two or more nodes in the directed graph based on similarities between operations performed by the two or more nodes.

14. A system comprising:

one or more processors; and a computer-readable memory storing particular instructions to cause the one or more processors to perform operators, the particular instructions comprising:

instructions to cause the one or more processors to receive a query from a user in a high-level query language;

instructions to cause the one or more processors to generate, in response to receiving the query, (1) a query execution plan for real-time event processing that can be executed by a continuous event processor to perform the query on events received via a data stream, (2) a batch job comprising operators for performing the query on a persistent data store, and (3) a merge component for merging results output from the batch job and the query execution plan;

instructions to cause a batch processor of the one or more processors to execute the batch job at a first time relative to a first set of events stored in the persistent data store at the first time to generate a first result, wherein the batch job completes at a second time following the first time and the first result is generated when the batch job completes;

instructions to cause the one or more processors to store, in response to the batch job completing at the second time, the first result in a location accessible to the continuous event processor;

instructions to cause the batch processor of the one or more processors to execute the batch job at the second time relative to a second set of events stored in the persistent data store at the second time to generate a second result, wherein the second set of events comprises the first set of events, and wherein the batch job completes at a third time following the second time;

instructions to cause the one or more processors to receive, between the second time and the third time, a third set of events via the data stream;

instructions to cause a continuous event processor of the one or more processors to, in response to receiving each of the events in the third set of events:

continuously execute the query execution plan relative to the received events in the third set of events to generate a third result merge, with the merge component, the first result stored in the location and the third result to generate a unified result; and output the unified result to one or more listening devices; and instructions to cause the one or more processors to replace, in response to the batch job completing at the third time, the first result with the second result in the location accessible to the continuous event processor.

15. The system of claim 14, wherein the wherein the query execution plan is functionally equivalent to and syntactically different from the batch job.

16. The system of claim 14, wherein the query is a continuous query language (CQL) query and the batch job is a Map-Reduce program.

17. The system of claim 14, wherein the particular instructions to generate the query execution plan, the batch job, and the merge component comprise:

instructions to cause the one or more processors to parse the query;

instructions to cause the one or more processors to separate, based on the parsing, the query into a set of continuous query language (CQL) operators;

instructions to cause the one or more processors to generate, based on specified mappings between CQL operators and Pig Latin operators, a set of Pig Latin operators that perform functionally equivalent operations as operations performed by the set of CQL operators;

instructions to cause the one or more processors to generate, based on the set of Pig Latin operators, the batch job; and instructions to cause the one or more processors to generate a merge operator to unite results of the query execution plan and the batch job to generate the merge component.

18. The system of claim 14, wherein the particular instructions further comprise:

to generate the query execution plan, the batch job, and the merge component comprise:

instructions to cause the one or more processors to parse the query;

instructions to cause the one or more processors to separate, based on the parsing, the query into a set of continuous query language (CQL) operators;

instructions to cause the one or more processors to generate, based on specified mappings between CQL operators and Pig Latin operators, a second set of Pig Latin operators that perform functionally equivalent operations as operations performed by the set of CQL operators; and instructions to cause the one or more processors to generate a directed graph of nodes including operators from the set of CQL operators, operators from the set of Pig Latin operators, edges from nodes representing operators from the first set of CQL operators to nodes representing operators from the set of Pig Latin operators, and edges from nodes representing operators form the set of Pig Latin operators to operators from the set of CQL operators.

19. The system of claim 14, wherein the particular instructions to generate the query execution plan, the batch job, and the merge component comprise:

instructions to cause the one or more processors to parse the query;

instructions to cause the one or more processors to separate, based on the parsing, the query into a set of continuous query language (CQL) operators;

instructions to cause the one or more processors to generate, based on specified mappings between CQL operators and Pig Latin operators, a set of Pig Latin operators that perform functionally equivalent operations as operations performed by the set of CQL operators;

instructions to cause the one or more processors to generate a directed graph of nodes including operators from the set of CQL operators and operators from the set of Pig Latin operators; and instructions to cause the one or more processors to merge two or more nodes in the directed graph based on similarities between operations performed by the two or more nodes.

\* \* \* \* \*

UNITED STATES PATENT AND TRADEMARK OFFICE
CERTIFICATE OF CORRECTION

Page 1 of 2

PATENT NO. : 10,956,422 B2
APPLICATION NO. : 14/079538
DATED : March 23, 2021
INVENTOR(S) : de Castro Alves It is certified that error appears in the above-identified patent and that said Letters Patent is hereby corrected as shown below:

On the Title Page

On page 6, Column 2, Item (56) under Other Publications, Line 48, delete "IIg" and insert -- 11g --, therefor.

On page 7, Column 2, Item (56) under Other Publications, Line 49, delete "Patentabiilty" and insert -- Patentability --, therefor.

On page 7, Column 2, Item (56) under Other Publications, Line 61, delete "Actio" and insert -- Action --, therefor.

On page 8, Column 1, Item (56) under Other Publications, Line 1, delete "retreived" and insert -- retrieved --, therefor.

On page 8, Column 1, Item (56) under Other Publications, Line 52, delete "and" and insert -- und --, therefor.

On page 8, Column 2, Item (56) under Other Publications, Line 52, delete "(OrdRing 2011)," and insert -- (OrdeRing 2011), --, therefor.

On page 9, Column 2, Item (56) under Other Publications, Line 13, delete "Janaury" and insert -- Jan. --, therefor.

On page 12, Column 1, Item (56) under Other Publications, Line 28, delete "Postgressql," and insert -- Postgresql, --, therefor.

On page 9, Column 2, Item (56) under Other Publications, Line 28, delete "PostgresSQL" and insert -- PostgreSQL --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,956,422 B2

On page 12, Column 2, Item (56) under Other Publications, Line 45, delete "Integrationand" and insert -- Integration and --, therefor.

On page 12, Column 2, Item (56) under Other Publications, Line 48, delete "SqiDataSource" and insert -- SqlDataSource --, therefor.

On page 13, Column 2, Item (56) under Other Publications, Line 38, after "Aug." insert -- 10, --.

On page 13, Column 2, Item (56) under Other Publications, Line 42, after "Oct." insert -- 11, --.

In the Specification

In Column 12, Line 1, delete "Inasmuch" and insert -- In as much --, therefor.

In the Claims

In Column 16, Line 53, in Claim 5, delete "LCQL)" and insert -- (CQL) --, therefor.

In Column 17, Line 12, in Claim 6, before "set" delete "first".

In Column 17, Line 14, in Claim 6, before "set" delete "first".

In Column 18, Line 52, in Claim 12, before "set" delete "first".

In Column 19, Line 57, in Claim 14, after "result" insert -- ; --.

In Column 20, Line 39, in Claim 18, before "set" delete "second".

In Column 20, Line 47, in Claim 18, before "set" delete "first".